(12) United States Patent
Moritomo et al.

(10) Patent No.: US 8,036,673 B2
(45) Date of Patent: Oct. 11, 2011

(54) STATUS NOTIFICATION METHOD IN WIRELESS COMMUNICATION APPARATUS

(75) Inventors: Takanori Moritomo, Yokohama (JP); Yosuke Takahashi, Yokohama (JP); Shiro Mazawa, Fujisawa (JP); Yusuke Takemichi, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 761 days.

(21) Appl. No.: 12/107,934

(22) Filed: Apr. 23, 2008

(65) Prior Publication Data

US 2009/0005054 A1    Jan. 1, 2009

(30) Foreign Application Priority Data

Jun. 29, 2007    (JP) ................. 2007-172068

(51) Int. Cl.
*H04W 72/00* (2009.01)

(52) U.S. Cl. .............. 455/450; 455/452.2; 370/329; 370/348; 709/229

(58) Field of Classification Search ........... 455/450, 455/452.2; 370/329, 348; 709/229
See application file for complete search history.

(56) References Cited

FOREIGN PATENT DOCUMENTS

| JP | 11-355846 | 12/1999 |
|---|---|---|
| JP | 2004-140519 | 5/2004 |
| JP | 2006-352744 | 12/2006 |

*Primary Examiner* — Dwayne Bost
*Assistant Examiner* — Amancio Gonzalez
(74) *Attorney, Agent, or Firm* — Antonelli, Terry, Stout & Kraus, LLP

(57) ABSTRACT

A call connection request from an access terminal is suppressed in a state in which the base station judges that the call connection is impossible, thereby suppressing a waste of the wireless band and the generation of noise. A BCMCS management block of an access point receives information indicating whether there is an allocable channel, from a channel management block of the access point, and information indicating whether the start of QoS can be accepted, from a QoS acceptance determination block of the access point, and the BCMCS management block distributes the information to the access terminal. Accordingly, the access point can inform the access terminal that it is not serviceable before channel allocation is attempted.

15 Claims, 19 Drawing Sheets

STATUS NOTIFICATION METHOD IN WIRELESS COMMUNICATION APPARATUS

BACKGROUND OF THE INVENTION

1. Field of the Invention

The present invention relates to status notification methods in wireless communication apparatuses, and more specifically, to a connection rejection status notification method for notifying a terminal that a call connection is restricted in a wireless communication apparatus in an 1xEVDO system having a BCMCS function.

2. Description of the Related Art

An explosion in the use of mobile communication terminals in recent years has rapidly promoted the standardization in an 1x Evolution data only (1xEVDO) system in the 3rd generation partnership project 2 (3GPP2). A standard (C.S 0054) for adding a broadcast multicast service (BCMCS) function to the system has also been stipulated.

FIG. 1 shows a typical structure of the 1xEVDO system including the BCMCS function.

The system includes a packet data serving node (PDSN) 101 having a function to terminate a packet from the Internet, an IP switch 102 for relaying an IP network and a RAN, an AN-AAA 103 for authenticating an access terminal (AT) 104, a packet call function-session control (PCF-SC) 105 for managing call control information and passing a packet from an access point (AP) 106 or the PDSN 101, an AP 106 having functions to pass a wireless packet between the AT 104 and the RAN 107, to perform handoff in the wireless area, and to distribute BCMCS data by radio, the radio access network (RAN) 107 formed by the AP 106 and the PCF-SC 105, the AT 104 being a wireless mobile terminal, a BCMCS serving node (BSN) 108 having a function to terminate a packet of BCMCS data from the Internet, a packet call function-broadcast (PCF-BC) 109 for passing a packet from the BSN 108, and a BCMCS controller 110 for managing the registration and cancellation of a BCMCS content.

Some related technologies have been disclosed. One technology disclosed in Japanese Unexamined Patent Application Publication No. 2004-140519 restricts call origination to a specific telephone number without generating an invalid resource in a wireless communication system. The target telephone number is stored in a server, and an access terminal (AT) obtains the information from the server. The AT restricts the success rate of call origination to the obtained telephone number independently. This prevents congestion caused by concentrated calling to the target telephone number from occurring.

Another technology disclosed in Japanese Unexamined Patent Application Publication No. 2006-352744 restricts VoIP call termination controlled by an access point (AP) in an IP-VT system. The AP monitors the number of current calls with respect to the number of calls that can be served. If it is determined that the call cannot be served, an apparatus in a higher level (SIP server) suppresses VoIP calls to access terminals (ATs) controlled by the AP.

SUMMARY OF THE INVENTION

In a general wireless communication system utilizing a public band, a plurality of mobile terminals uses the limited band. When it becomes unnecessary to maintain a call connection status, the band and the channel are released immediately and can be allocated to another terminal. When a terminal makes a call connection request, it asks the base station whether the call connection is possible. This inquiry uses the wireless band. Even when the call connection is impossible, the wireless band is used to make the inquiry. This will generate upstream or downstream noise and can adversely affect the communication of a call in progress. The use of a further band during band congestion can be a factor for generating further congestion.

In the 1xEVDO system, an AT knows that a call connection is impossible because the channel cannot be allocated, by making an operation to request the call connection. As for VoIP using the 1xEVDO system, the AT knows that the AP rejects the start of QoS for VoIP as a result of a QoS acceptance determination, by receiving a notification of the rejection of QoS registration. In those systems, the notification is made in such a form that the AP rejects a request from the AT. With the conventional technologies, the AT cannot know in advance the unserviceable state. To solve this problem, a means for reporting the unserviceable state from the AP to the AT beforehand is necessary.

Accordingly, it is an object of the present invention to suppress a call connection request from the AT in a state in which the base station determines that the call connection is impossible, thereby suppressing a waste of the wireless band and the generation of noise.

The technology disclosed in Japanese Unexamined Patent Application Publication No. 2004-140519 avoids predicted concentrated calling. The technology does not restrict a call to an unspecified terminal and consequently does not relate to the present invention.

The technology disclosed in Japanese Unexamined Patent Application Publication No. 2006-352744 does not restrict the call origination processing and is not associated with the present invention. The AP must check and manage ATs that are not connected in the local area, so that it would be difficult to apply it separately to the 1xEVDO system.

In the present invention, for example, a BCMCS management block of the AP 106 is reported whether there is an allocatable channel, from a channel management block of the AP 106, and whether the start of QoS can be accepted, from a QoS acceptance determination block of the AP 106, and distributes the information to the ATs 104, so that the AP can inform the ATs of an unserviceable state before channel allocation is attempted.

According to the first solving means of the present invention, there is provided a status notification method in a wireless communication apparatus for performing wireless communication with a wireless terminal, the status notification method comprising the steps of:

the wireless communication apparatus receiving a call connection request from the wireless terminal;

the wireless communication apparatus obtaining unallocated channels by excluding reserved channels and occupied channels from all channels, and determining that channel allocation is possible if there is an unallocated channel or determining that channel allocation is impossible because of congestion if there is no unallocated channel;

if the determination indicates that channel allocation is possible, the wireless communication apparatus performing channel allocation processing for the wireless terminal;

if it is determined that the channel allocation processing has increased the occupied channels, remaining no unallocated channel, the wireless communication apparatus broadcasting first channel congestion information to announce the occurrence of congestion in an area of the wireless communication apparatus; and the wireless terminal in a communication area of the wireless communication apparatus displaying information notifying the user of the congestion on a display screen when it receives the first channel congestion information.

According to the second solving means of the present invention, there is provided a status notification method in a wireless communication apparatus for performing wireless communication with a wireless terminal, the status notification method comprising the steps of:

the wireless communication apparatus receiving a QoS start request containing an upstream QoS identifier and a downstream QoS identifier from the wireless terminal;

executing a first upstream noise determination by comparing a current noise level Ns of upstream traffic noise measured in the wireless communication apparatus with a permissible noise level ShN to start QoS, corresponding to the upstream QoS identifier and, if Ns<ShN, determining that upstream QoS can be accepted;

executing a first downstream band determination by comparing a band B obtained by subtracting a QoS occupied band from the entire downstream band BW, with a band R required to start QoS, corresponding to the downstream QoS identifier and, if B>R, determining that downstream QoS can be accepted;

executing a first QoS acceptance determination to determine that it is serviceable if both the first upstream noise determination and the first downstream band determination indicate that it is serviceable;

adding the downstream QoS identifier corresponding to the wireless terminal to an occupied QoS table if the first QoS acceptance determination indicates that it is serviceable;

sending a QoS start acknowledgment to the wireless terminal;

executing a second upstream noise determination by comparing the current noise level Ns of the upstream traffic noise measured by an upstream traffic reception block of the wireless communication apparatus with the permissible noise level ShN to start QoS, predetermined for VoIP or another specific service and corresponding to an upstream QoS identifier setting, and if Ns<ShN, determining that upstream QoS can be accepted;

executing a second downstream band determination by comparing the band B obtained by subtracting the QoS occupied band obtained from the occupied QoS table updated when the downstream QoS identifier is added to the table, from the entire downstream band BW, with the band R required to start QoS, predetermined for VoIP or another specific service and corresponding to a downstream QoS identifier setting, and if B>R, determining that downstream QoS can be accepted;

executing a second QoS acceptance determination to determine that it is serviceable if both the second upstream noise determination and the second downstream band determination indicate that it is serviceable;

broadcasting first channel congestion information in an area of the wireless communication apparatus if the second QoS acceptance determination indicates that it is not serviceable; and the wireless terminal in a communication area of the wireless communication apparatus displaying information notifying the user of the occurrence of congestion on a display screen when it receives the first channel congestion information.

According to the third solving means of the present invention, there is provided a status notification method in a wireless communication apparatus for performing wireless communication with a wireless terminal, the status notification method comprising the steps of:

the wireless communication apparatus receiving a call connection request from the wireless terminal;

the wireless communication apparatus obtaining unallocated channels by excluding reserved channels and occupied channels from all channels, and determining that channel allocation is possible if there is an unallocated channel or determining that channel allocation is impossible because of congestion if there is no unallocated channel;

if the determination indicates that channel allocation is possible, the wireless communication apparatus performing channel allocation processing for the wireless terminal;

if it is determined that the channel allocation processing has increased the occupied channels, remaining no unallocated channel, the wireless communication apparatus broadcasting first channel congestion information to announce the occurrence of congestion in an area of the wireless communication apparatus; and the wireless terminal in a communication area of the wireless communication apparatus displaying information notifying the user of the congestion on a display screen when it receives the first channel congestion information; and, the wireless communication apparatus receiving a QoS start request containing an upstream QoS identifier and a downstream QoS identifier from the wireless terminal;

executing a first upstream noise determination by comparing a current noise level Ns of upstream traffic noise measured by an upstream traffic reception block of the wireless communication apparatus with a permissible noise level ShN to start QoS, corresponding to the upstream QoS identifier and, if Ns<ShN, determining that upstream QoS can be accepted;

executing a first downstream band determination by comparing a band B obtained by subtracting a QoS occupied band from the entire downstream band BW, with a band R required to start QoS, corresponding to the downstream QoS identifier and, if B>R, determining that downstream QoS can be accepted;

executing a first QoS acceptance determination to determine that it is serviceable if both the first upstream noise determination and the first downstream band determination indicate that it is serviceable;

adding the downstream QoS identifier corresponding to the wireless terminal to an occupied QoS table if the first QoS acceptance determination indicates that it is serviceable;

sending a QoS start acknowledgment to the wireless terminal;

executing a second upstream noise determination by comparing the current noise level Ns of the upstream traffic noise measured by the upstream traffic reception block of the wireless communication apparatus with the permissible noise level ShN to start QoS, predetermined for VoIP or another specific service and corresponding to an upstream QoS identifier setting, and if Ns<ShN, determining that upstream QoS can be accepted;

executing a second downstream band determination by comparing the band B obtained by subtracting the QoS occupied band obtained from the occupied QoS table updated when the downstream QoS identifier is added to the table, from the entire downstream band BW, with the band R required to start QoS, predetermined for VoIP or another specific service and corresponding to a downstream QoS identifier setting, and if B>R, determining that downstream QoS can be accepted;

executing a second QoS acceptance determination to determine that it is serviceable if both the second upstream noise determination and the second downstream band determination indicate that it is serviceable;

broadcasting second channel congestion information in an area of the wireless communication apparatus if the second QoS acceptance determination indicates that it is not serviceable; and the wireless terminal in a communication area of the wireless communication apparatus displaying information notifying the user of the occurrence of congestion on a display screen when it receives the second channel congestion information.

The present invention suppresses a call connection request from an AT in a state in which the base station determines that the call connection is impossible, thereby suppressing a waste of the wireless band and the generation of noise.

The present invention can notify a plurality of wireless terminals of a status of a wireless communication system communicating with the wireless terminals, by using a channel that allows the wireless terminals to receive information, without connecting the wireless terminals.

DESCRIPTION OF THE PREFERRED EMBODIMENTS

1. Related Art

Figure 1:
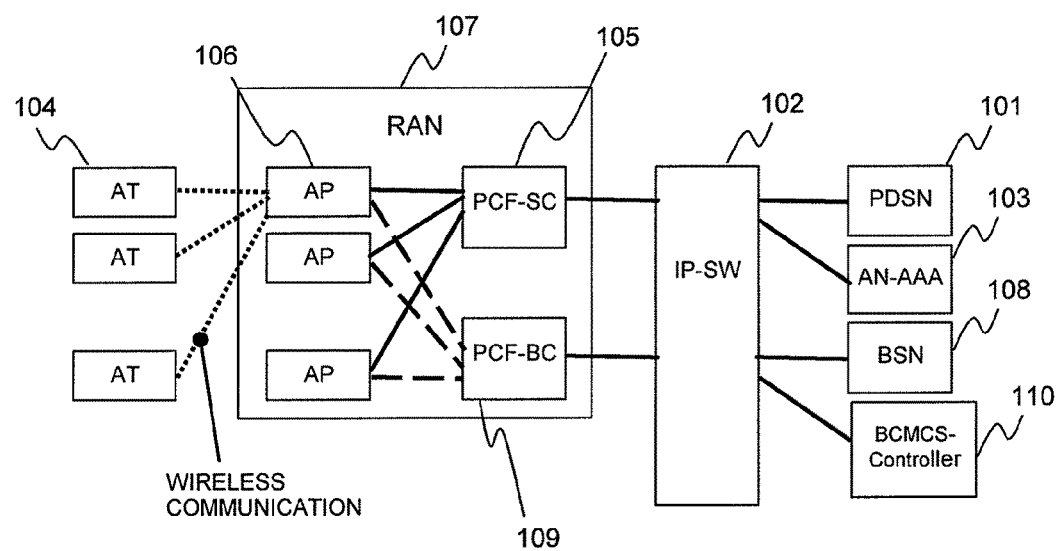
FIG. 1 shows a typical structure of a 1xEVDO system including a BCMCS function.
Figure 2:
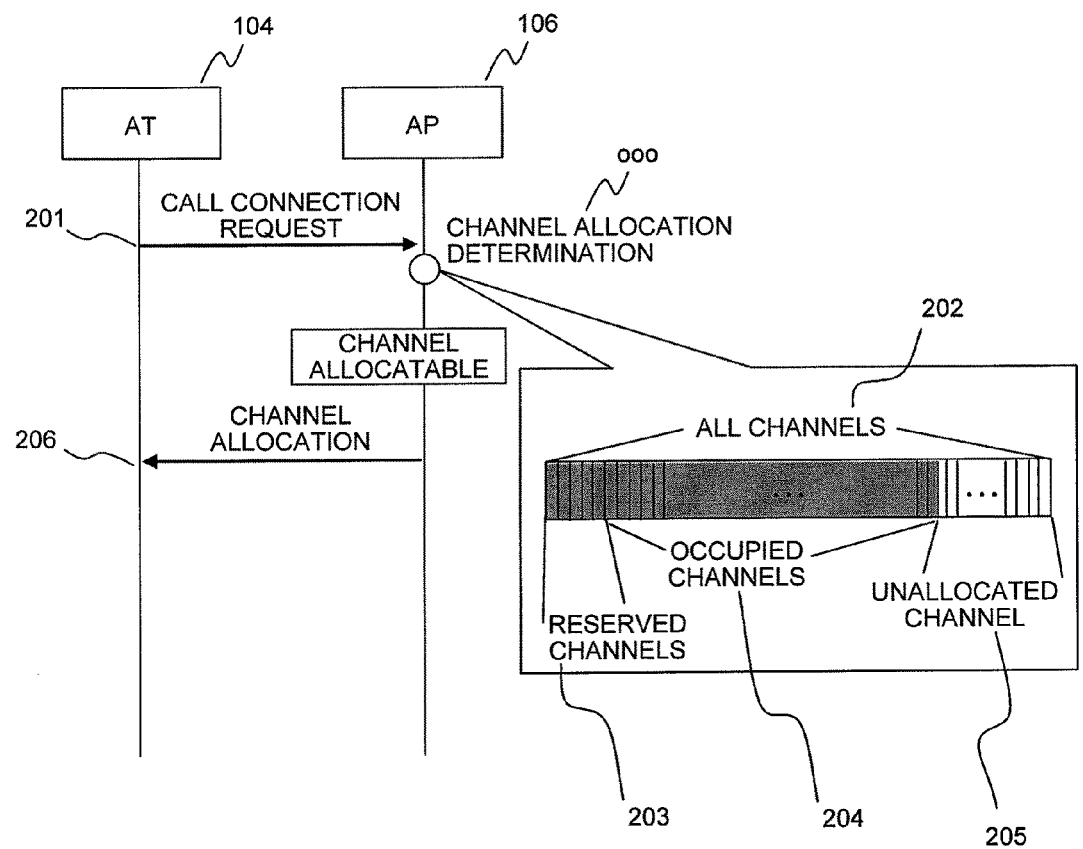
FIG. 2 shows a sequence of steps in which a call connection can be started successfully in a 1xEVDO system.

FIG. 2 shows a sequence of steps in which a call connection can be started successfully in a 1xEVDO system.

At the start of a call connection, an access terminal (AT) 104 issues a call connection request (201) to an access point (AP) 106. The call connection request is issued at power-up, at a dial-up connection, at the beginning of data communication (such as the transmission of an e-mail message) on expiry of a certain period after the end of the dial-up connection establishment, for example. The AP 106 determines whether the AT 104 can be allocated to an unallocated channel 205, remaining after continuously reserved channels 203 and occupied channels 204, which depend on the number of calls, are excluded from all the channels 202. If there is an unallocated channel, channel allocation is possible. If there is no unallocated channel, channel allocation is impossible because of congestion. If it is determined that channel allocation is possible, the AP 106 sends a channel allocation signal (206) to the AT 104 and goes to subsequent processing.

Kept as reserved channels are common channels that are temporarily used at the start of a call connection of all ATs and broadcast distribution channels that can be received by all the ATs. The numbers assigned to the reserved channels do not change, and the reserved channels must have the same numbers for all APs. Accordingly, all the ATs can access the reserved channels. The reserved channels include common channels and broadcast distribution channels. The common channels are used just temporarily at the start of an initial call connection. After an unallocated channel is allocated to the AT, the AT releases the common channel. In the broadcast distribution channels, nothing is transmitted from the AT to the AP. All the ATs can receive a broadcast equally by referencing the broadcast distribution channel.

Figure 3:
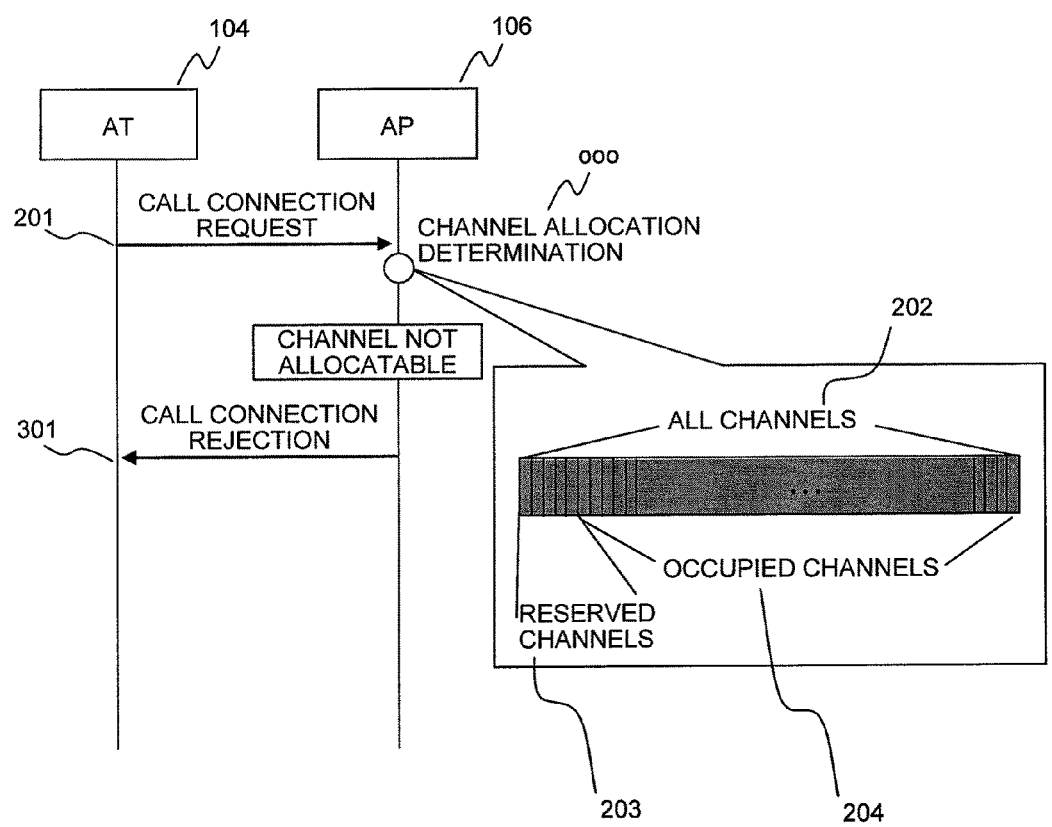
FIG. 3 shows a sequence of steps in which a call connection cannot be started successfully in the 1xEVDO system.

FIG. 3 shows a sequence of steps in which a call connection cannot be started successfully in the 1xEVDO system.

The AP 106 determines whether the AT 104 can be allocated to a channel, in the same way as when the connection is started successfully. If it is determined that channel allocation is impossible, the AP 106 sends a call connection rejection signal (301) to the AT.

The QoS function stipulated in C.R1001-E is used to implement a VoIP service using the 1xEVDO system. After the call connection is completed as described earlier, QoS registration for VoIP is performed.

Figure 4:
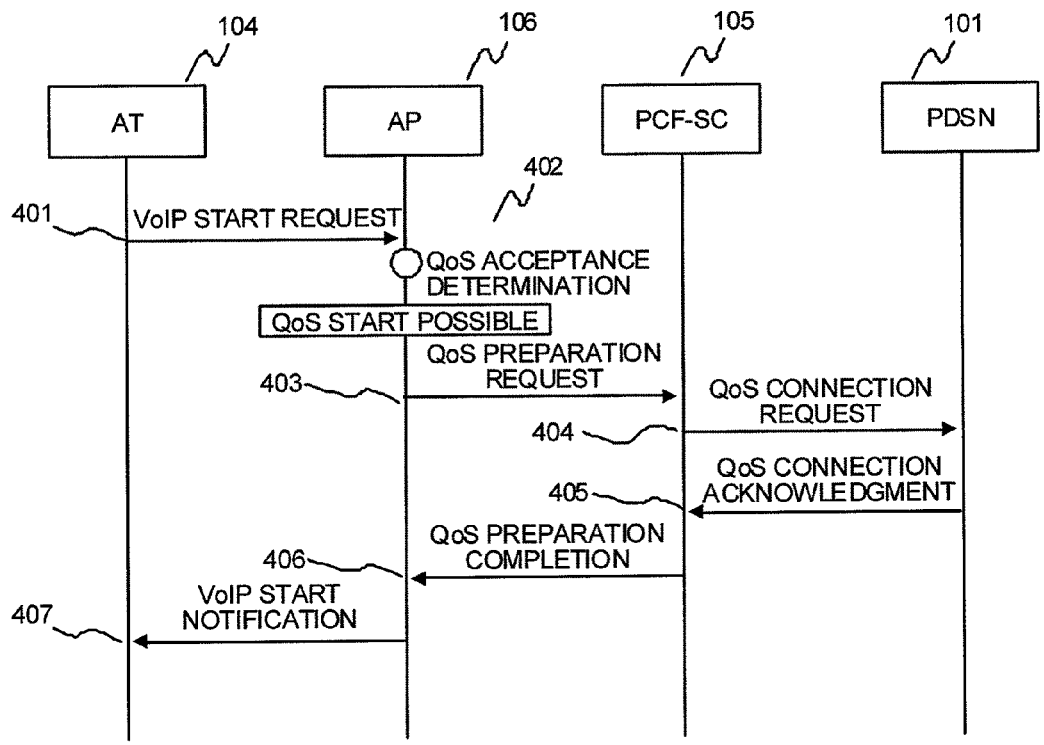
FIG. 4 shows a sequence of steps in which QoS registration can be performed successfully.

FIG. 4 shows a sequence of steps in which QoS registration can be performed successfully.

The AT 104 issues a VoIP start request (401) to the AP 106. The AP 106 makes a QoS acceptance determination (402) to determine whether QoS for VoIP for the AT 104 can be started. The QoS acceptance determination will be described later in detail. If it is determined that QoS can be started, the AP 106 issues a QoS preparation request (403) to a PCF-SC 105, and the PCF-SC 105 issues a QoS connection request (404) to a PDSN 101. After the QoS connection request (404) is received, the PDSN 101 sends a QoS connection acknowledgment (405) to the PCF-SC 105, and the PCF-SC 105 sends a QoS preparation completion (406) to the AP 106. After the QoS preparation completion (406) is received, the AP 106 issues a VoIP start notification (407) to the AT 104.

Figure 5:
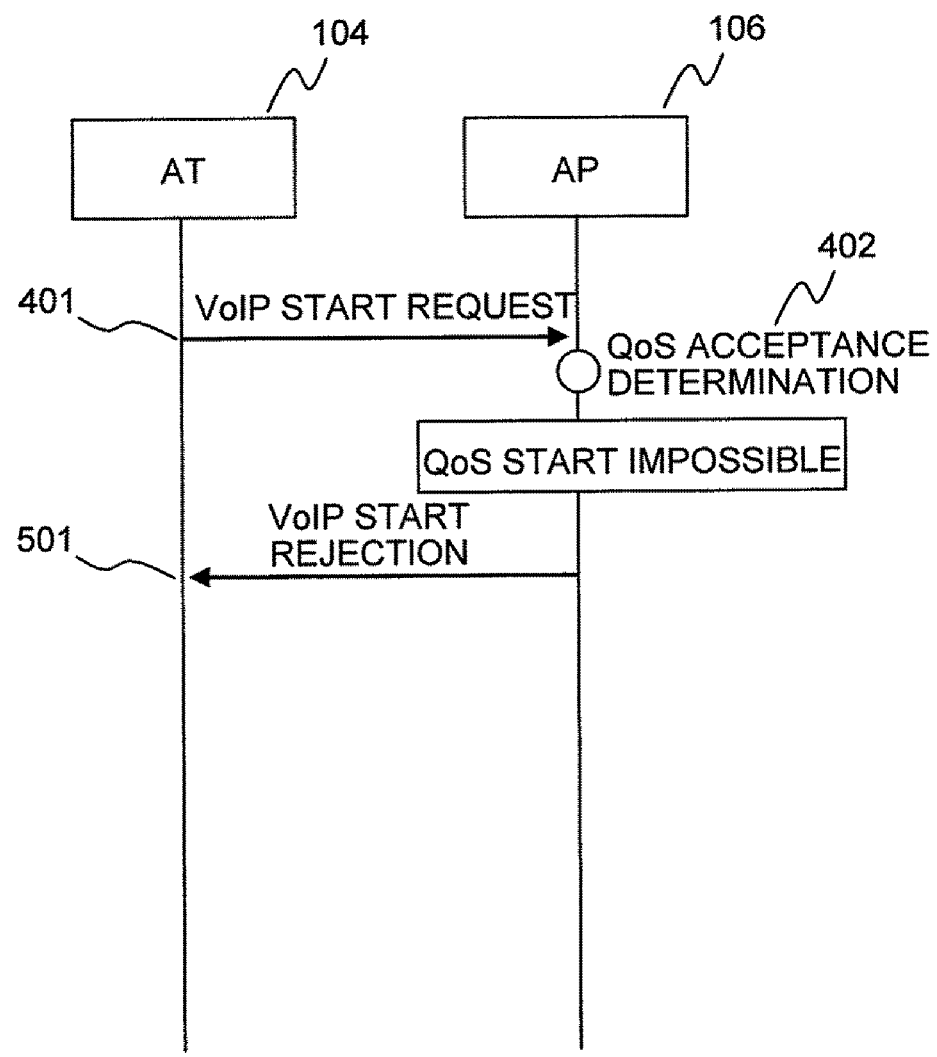
FIG. 5 shows a sequence of steps in which QoS registration cannot be performed successfully.

FIG. 5 shows a sequence of steps in which QoS registration cannot be performed successfully.

The AP 106 makes a QoS acceptance determination (402) to determine whether QoS for VoIP for the AT 104 can be started, in the same way as when the registration is performed successfully. If it is determined that QoS cannot be started, the AP 106 issues a VoIP start rejection (501) to the AT 104.

Figure 6:
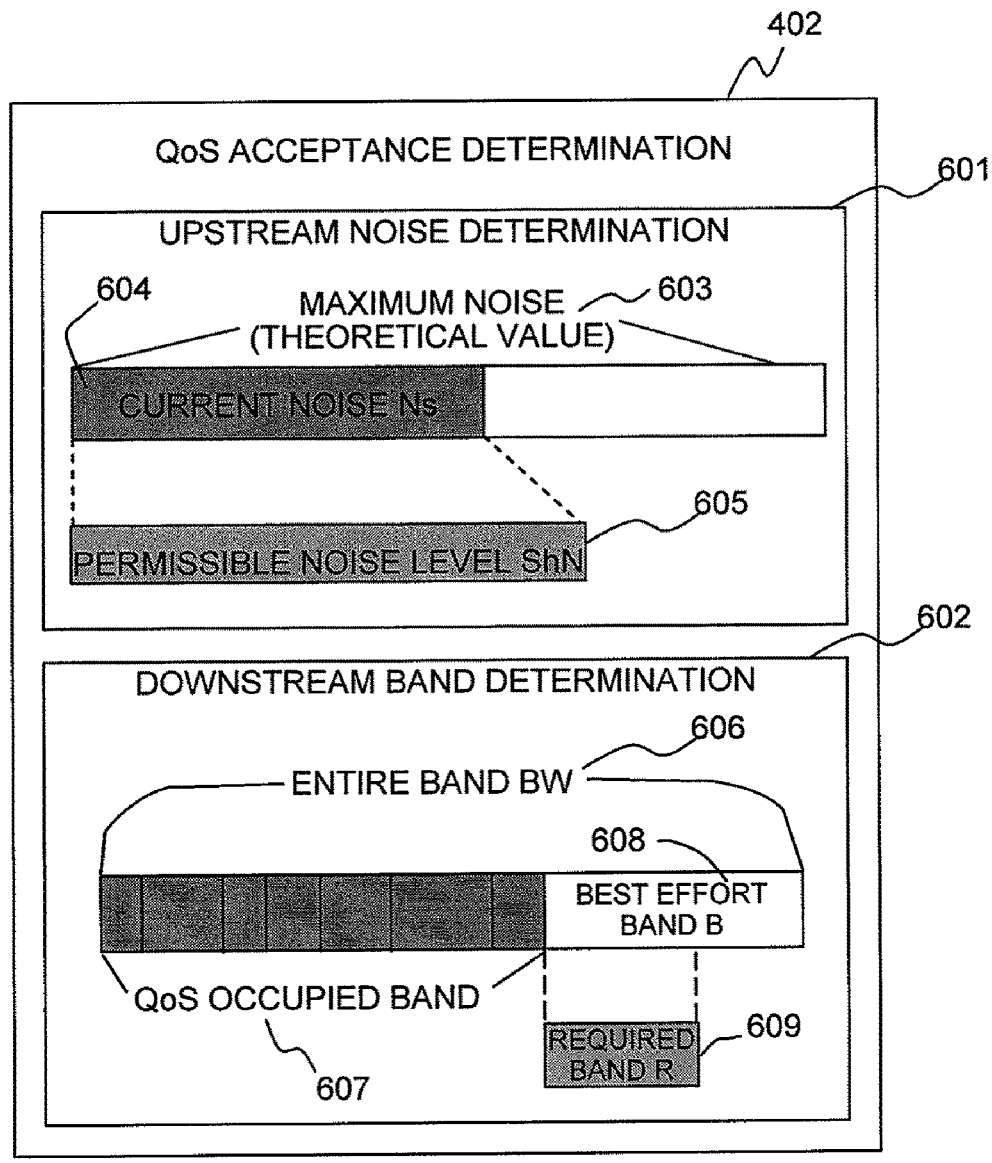
FIG. 6 illustrates a QoS acceptance determination (402) in detail.

FIG. 6 illustrates the QoS acceptance determination (402) in detail.

The QoS acceptance determination (402) includes an upstream noise determination (601) and a downstream band determination (602). If the two determinations indicate that it is serviceable, QoS can be started. In the upstream noise determination (601), a current noise level Ns (604) of upstream traffic noise measured by an upstream traffic reception block of the AP 106 is compared with a permissible noise level ShN (605) to start QoS. If Ns<ShN, it is determined that upstream QoS can be accepted. In the downstream band determination (602), best effort band B (608) obtained by subtracting QoS occupied band (607) from the entire downstream band BW (606) is compared with band R required to start QoS (609). If B>R, it is determined that downstream QoS can be accepted.

Figure 7:
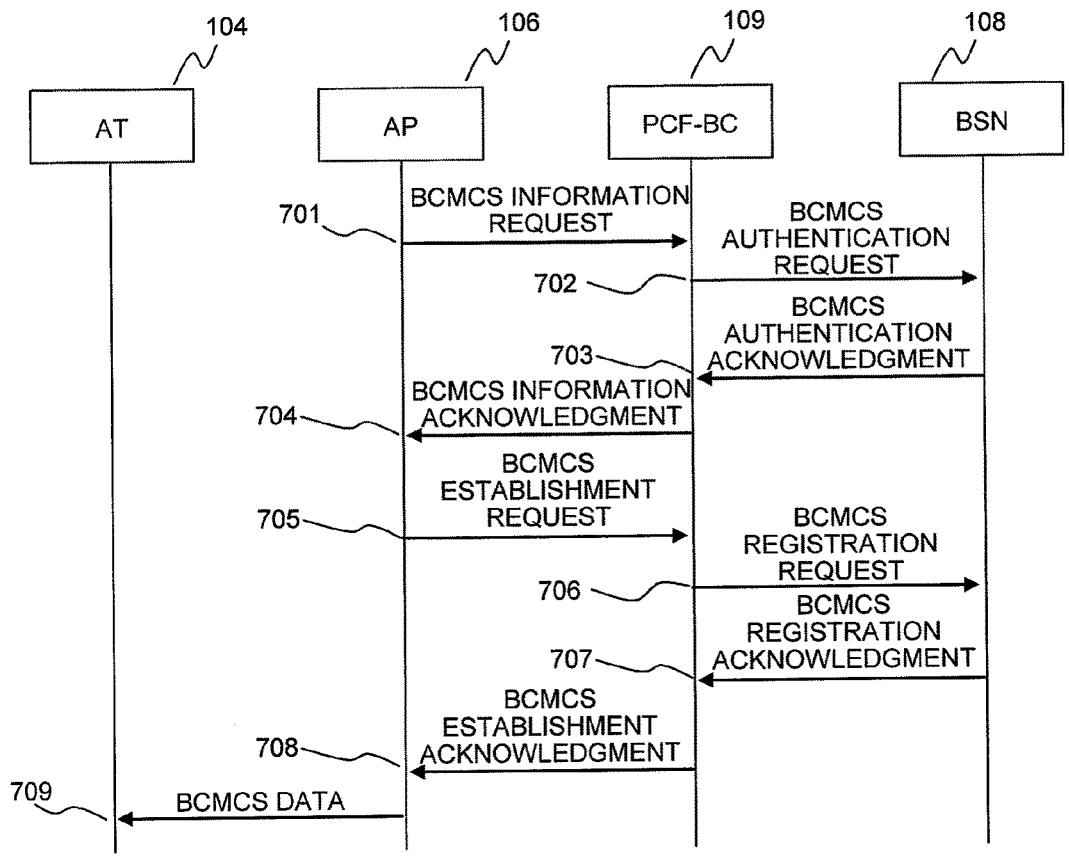
FIG. 7 shows a sequence of steps of starting the distribution of a registered BCMCS content in the 1xEVDO system.

FIG. 7 shows a sequence of steps of starting the distribution of a registered BCMCS content in the 1xEVDO system.

The AP 106 issues a BCMCS information request (701) to a PCF-BC 109 at a predetermined time, and the PCF-BC 109 issues a BCMCS authentication request (702) to a BSN 108. When the BCMCS authentication request (702) is received, the BSN 108 sends a BCMCS authentication acknowledgment (703) to the PCF-BC 109, and the PCF-BC 109 sends a BCMCS information acknowledgment (704) to the AP 106. When the BCMCS information acknowledgment is received, the AP 106 issues a BCMCS establishment request (705) to the PCF-BC 109, and the PCF-BC 109 issues a BCMCS registration request (706) to the BSN 108. When the BCMCS registration request (706) is received, the BSN 108 sends a BCMCS registration acknowledgment (707) to the PCF-BC 109, and the PCF-BC 109 sends a BCMCS establishment acknowledgment (708) to the AP 106. When the BCMCS establishment acknowledgment is received, the AP 106 distributes BCMCS data (709) to all ATs, including the AT 104, in the area controlled by the local AP.

2. First Embodiment

Congestion Notification

When a call connection is impossible because of channel congestion, the BCMCS is used to notify the AT of the fact. The notification method and an example of operation of the AT which has received the notification will be described below.

A case in which a single AP gives a notification of the congestion of a channel controlled by the AP will be described.

Figure 8:
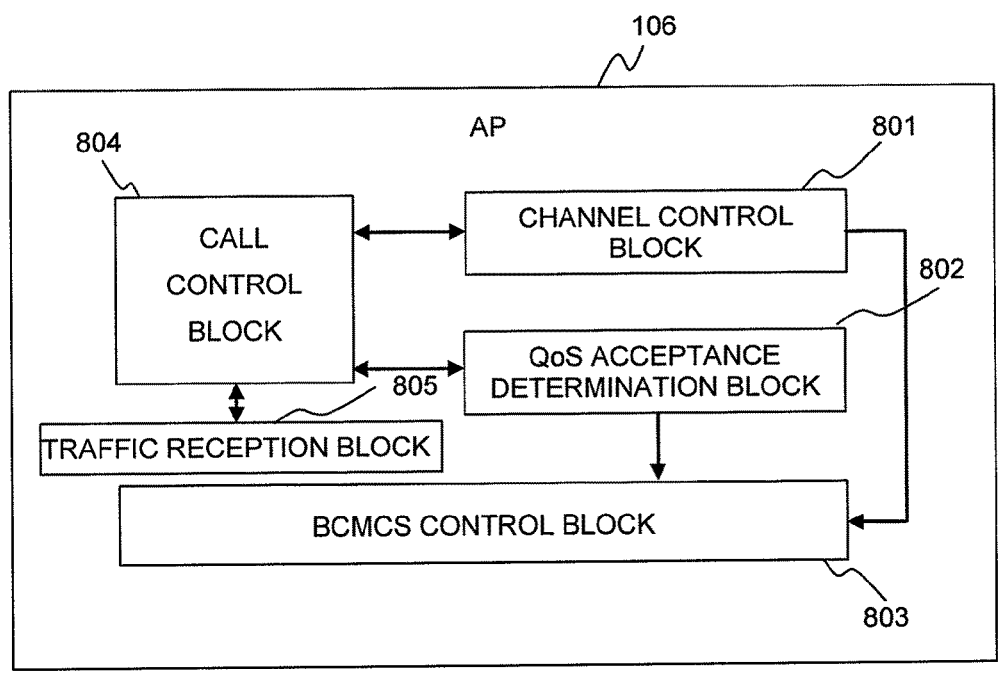
FIG. 8 shows a control structure of an AP 106, required to implement a function.

FIG. 8 shows a control structure of the AP 106 required to implement a function.

The AP 106 includes a call control block 804 for performing entire call processing, a channel control block 801 for managing channel allocation, a QoS acceptance determination block 802 for making a QoS acceptance determination illustrated in FIG. 6, a BCMCS control block 803 for controlling BCMCS, and a traffic reception block 805 for measuring upstream traffic noise. The call control block 804 and the channel control block 801 have an interface that allows information to be transferred between them. The call control block 804 and the QoS acceptance determination block 802 have an interface that allows information to be transferred between them. The channel control block 801 and the QoS acceptance determination block 802 have interfaces to send information to the BCMCS control block 803. Although the BCMCS control block 803 in this embodiment does not have an interface to transfer information to another control block, that type of interface may be provided.

Figure 9:
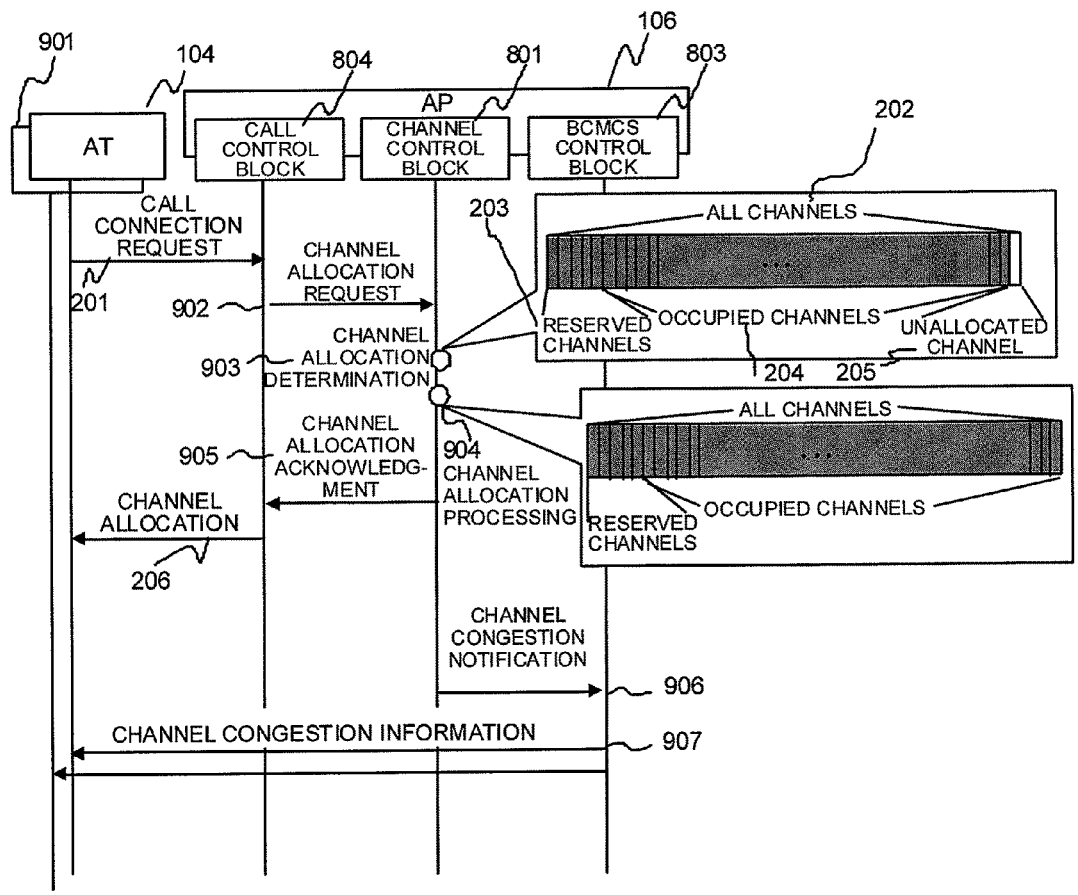
FIG. 9 shows a sequence of steps of implementing a function by a channel allocation determination.
Figure 9:
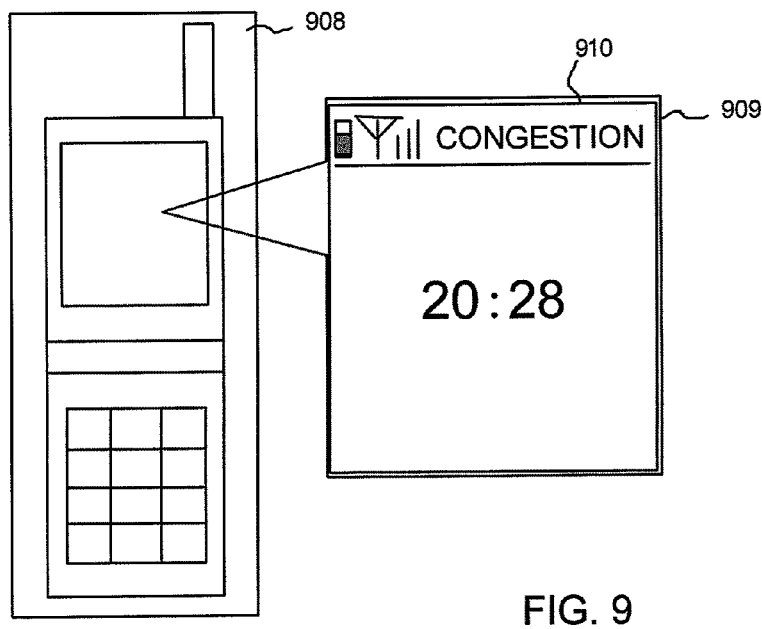

FIG. 9 shows a sequence of steps of implementing a function by a channel allocation determination. The AP 106 has the AT 104 and an AT 901 in its area. When the AP 106 receives a call connection request (201) from the AT 104, the call control block 804 issues a channel allocation request (902) to the channel control block 801.

The call connection request is issued at power-up, at a dial-up connection, at the beginning of data communication (such as the transmission of an e-mail message) on expiry of a certain period after the end of the dial-up connection establishment, for example.

The channel control block 801 makes a channel allocation determination (903) and determines that channel allocation is possible because there is an unallocated channel 205. Since the allocation is possible, the channel control block 801 performs channel allocation processing (904) and sends a channel allocation acknowledgment (905) to the call control block 804. When the acknowledgment is received, the call control block 804 sends channel allocation (206) to the AT 104. If the channel allocation processing has increased the occupied channels (204), leaving no unallocated channels (205), the channel control block 801 issues a channel congestion notification (906) to the BCMCS control block 803. If there still remains an unallocated channel, the channel congestion notification (906) is not sent, and channel congestion information (907) is not broadcasted. The BCMCS control block 803 broadcasts the channel congestion information (907) as BCMCS data, in the area of the AP 106. The BCMCS data can be sent by using a channel included in the reserved channels 203. The reserved channels were described earlier with reference to FIG. 2. The AT 104 and the AT 901 in the area of the AP 106 receive the channel congestion information (907). A display screen 909 of an AT 908 which has received the channel congestion information, represented by the AT 901, displays information (910) notifying the user of the occurrence of congestion (see a lower part of FIG. 9).

Figure 10:
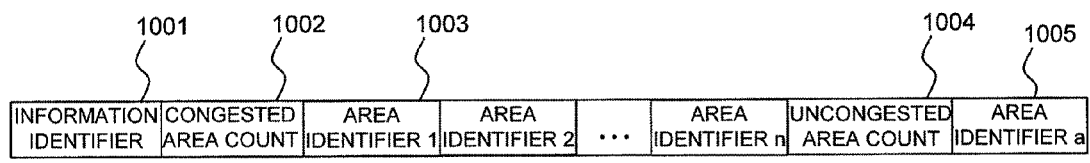
FIG. 10 illustrates channel congestion information (907) in detail.

FIG. 10 illustrates the channel congestion information (907) in detail.

The channel congestion information (907) contains an information identifier 1001 for indicating that the data is channel congestion information, immediately followed by a congested area count 1002 indicating the number of congested areas included in the information and the area identifiers 1003 of the congested areas. The area identifier 1003 stored in the 1xEVDO system is a pilot PN (8 bits) stipulated in C.S 0024. The area identifiers 1003 are followed by an uncongested area count 1004 indicating the number of uncongested areas and the area identifiers 1005 of the uncongested areas, which are used to report the fact of congestion clear-up when it occurs, which will be described later. The area identifiers 1005 may be of the same type as the area identifiers 1003. However, the area identifiers 1005 do not overlap the area identifiers 1003.

Clear-Up Notification

When channel congestion, which has disabled a call connection, is cleared up, the BCMCS is used to notify the ATs that the channel congestion has been cleared up. The notification method will be described below.

Figure 11:
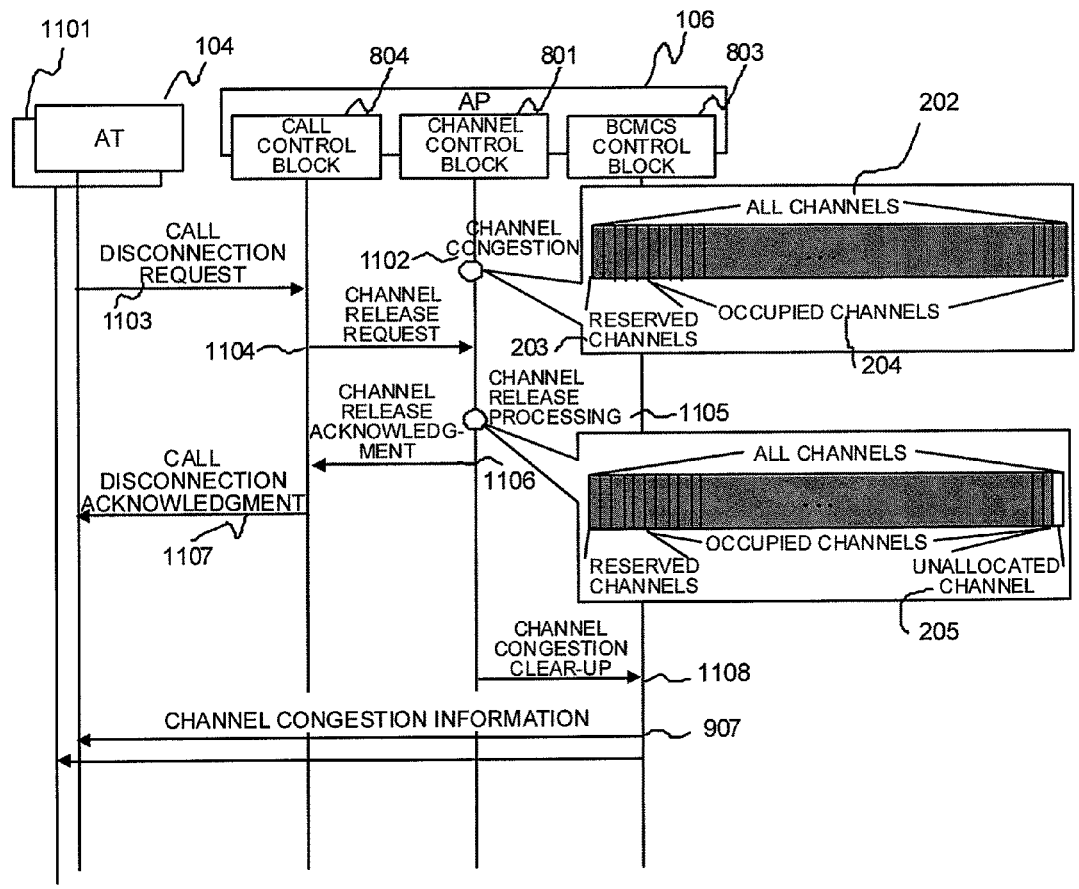
FIG. 11 shows a sequence of steps in which a single AP reports that channel congestion under the control of the AP has been cleared up.
Figure 11:
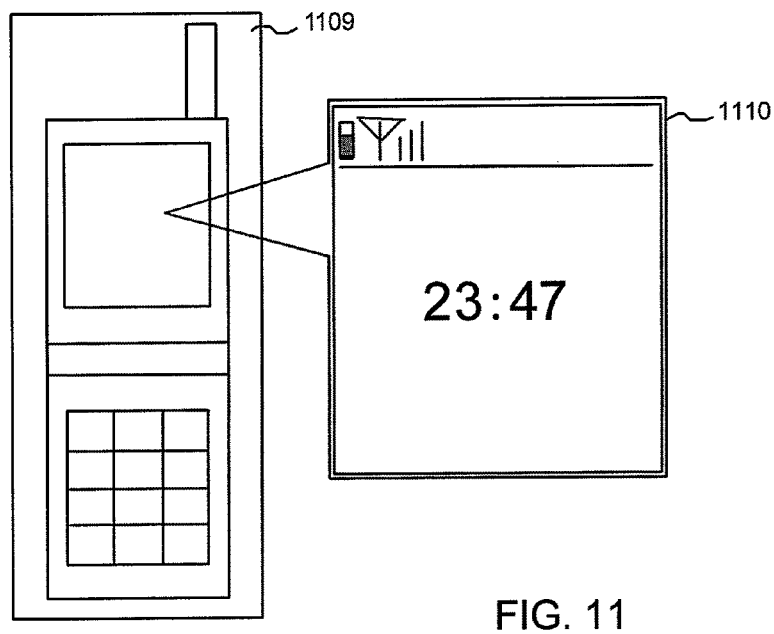

FIG. 11 shows a sequence of steps in which a single AP reports that the congestion of a channel controlled by the AP has been cleared up.

The AT 104 and an AT 1101 are in the area, and the AT 104 is in the call connection state. The channel control block 801 of the AP 106 has detected channel congestion (1102) as described earlier in "Congestion notification" of the first embodiment. The call control block 804 of the AP 106 receives a call disconnection request (1103) from the AT 104 and issues a channel release request (1104) to the channel control block 801. The call disconnection request can be issued when the power-down button is pressed, at a dial-up disconnection, on expiry of a certain period after the end of a dial-up connection establishment (such as at the end of transmission of an e-mail message), for instance.

The channel control block 801 performs channel release processing (1105) and sends a channel release acknowledgment (1106) to the call control block 804. The call control block 804 receives the acknowledgment and sends a call disconnection acknowledgment (1107) to the AT 104. If the channel release processing decreases the occupied channels (204), providing an unallocated channel (205), the channel control block 801 issues channel congestion clear-up (1108) to the BCMCS control block 803. If the processing does not provide an unallocated channel, the channel congestion clear-up (1108) is not sent, and the channel congestion information (907) is not broadcasted. The BCMCS control block 803 broadcasts the channel congestion information (907) as BCMCS data in the area of the AP 106 by using some of the reserved channels 203 or the like. The AT 104 and the AT 1101 in the area of the AP 106 receive the channel congestion information (907). On a display screen 1110 of an AT 1109 which has received the channel congestion information (907), represented by the AT 1101, the information (910) notifying the user of the occurrence of the congestion disappears.

3. Second Embodiment

Congestion Notification

When QoS for VoIP cannot be started as a result of a QoS acceptance determination, the BCMCS is used to notify the AT of the fact. The notification method and an example of operation of the AT which has received the notification will be described below. A case in which a single AP reports that QoS cannot be started in the area of the AP will be described.

Figure 12:
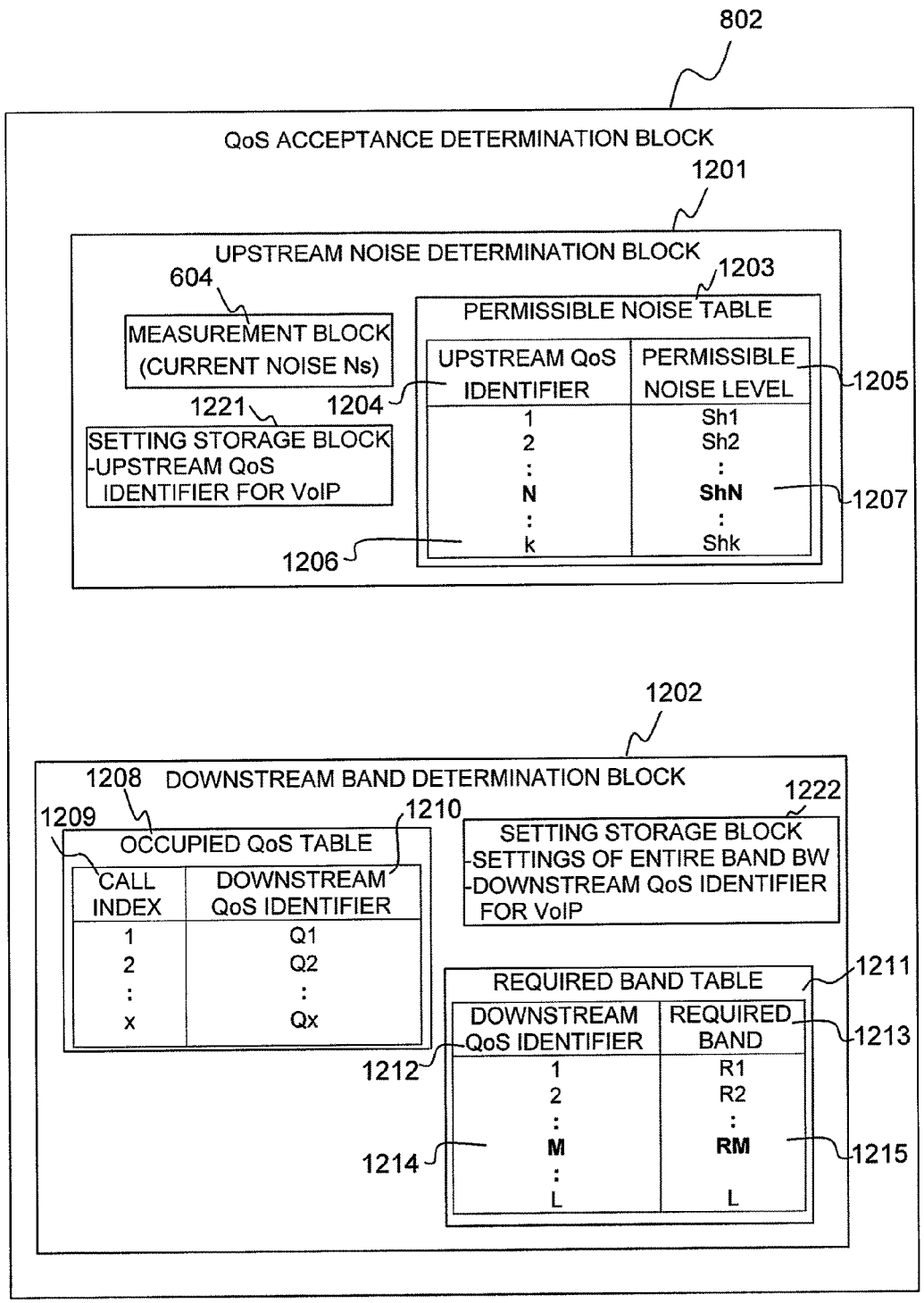
FIG. 12 shows an internal structure of a QoS acceptance determination block 802.

FIG. 12 shows an internal structure of the QoS acceptance determination block 802.

The QoS acceptance determination block 802 includes an upstream noise determination block 1201 for making the upstream noise determination (601) and a downstream band determination block 1202 for making the downstream band determination (602). The upstream noise determination block 1201 includes a measurement block 604 which always monitors the current upstream noise N (604), a permissible noise table 1203 including a list of upstream QoS identifiers (1 to k) 1204 and a corresponding list of permissible noise levels (1 to Shk) 1205, and a setting storage block 1221 for storing in advance upstream QoS identifiers corresponding to VoIP (or a predetermined service). The permissible noise level is such a threshold level that if the current noise is smaller than the permissible noise level, QoS predetermined for the upstream QoS identifier can be started and provided. The downstream band determination block 1202 includes an occupied QoS table 1208 including a list of connected call indices (1 to x) 1209 and a corresponding list of downstream QoS identifiers (Q1 to Qx) 1210, a required band table 1211 including a list of downstream QoS identifiers (1 to L) 1212 and a corresponding list of required bands (R1 to RL), and a setting storage block 1222 for storing in advance the settings of the entire band (606) and downstream QoS identifiers corresponding to VoIP (or a predetermined service). The downstream band determination block 1202 assigns reference numbers 1 to X such as sequence numbers as call indices with respect to the occupied QoS and stores the downstream QoS identifiers corresponding to the call indices in the occupied QoS table 1208. In the shown example, the QoS identifiers Q1 to Qx always take the values of 1 to L, respectively.

In an upstream noise determination, the current upstream noise Ns (604) can be compared with the permissible noise level ShN (1207) found on the basis of the target upstream QoS identifier N (1206). The QoS occupied band (607) can be obtained by obtaining bands required for all the downstream QoS identifiers 1210 included in the occupied QoS table 1208 by using the required band table 1211 and by accumulating all the required bands. The best effort band B (608) can be obtained from the QoS occupied band (607) and the entire band BW (606). A required band RM (1215) of the target QoS can be obtained from the target downstream QoS identifier M (1214). By using the information, a downstream band determination can be made.

When the required band corresponding to Qx is denoted as $R_{Qx}$, the best effort band B (608) can be expressed by using $R_{Qx}$ and BW as follows:

$$B = BW - \Sigma R_{Qx}$$

A condition of accepting downstream QoS for the QoS identifier M if B>RM can be expressed as:

$$BW - \Sigma R_{Qx} > RM$$

Figure 13:
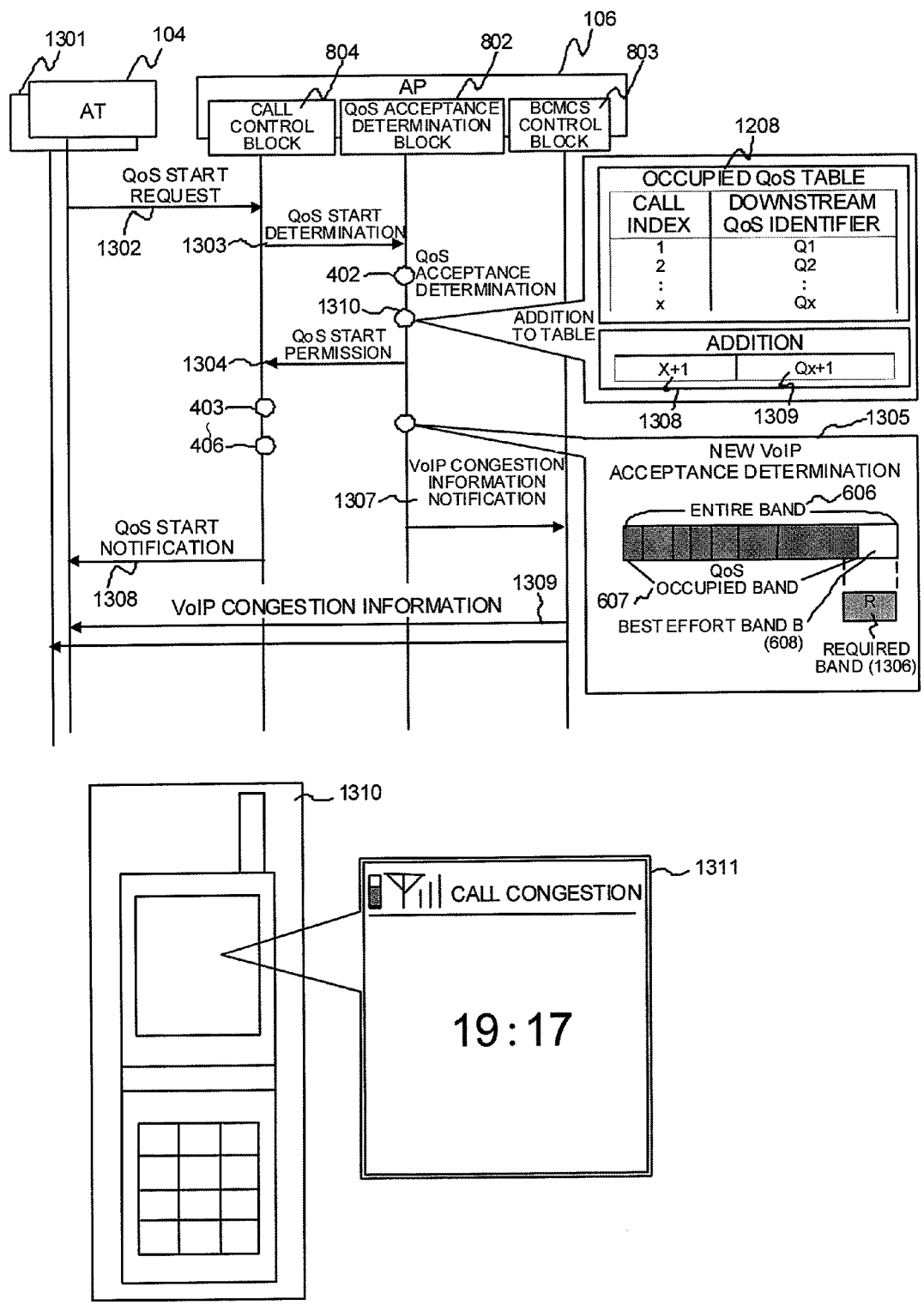
FIG. 13 shows a sequence of steps of implementing a function by a QoS acceptance determination.

FIG. 13 shows a sequence of steps of implementing a function by a QoS acceptance determination.

The AT 104 and an AT 1301 are in the area of the AP 106. When the AP 106 receives a QoS start request (1302) from the AT 104, the call control block 804 issues a QoS start determination (1303) to the QoS acceptance determination block 802. The QoS start request is issued as driven by an operation carried out on the AT, such as pressing the start button to start a VoIP call, pressing the start button to start IP-VT, receiving a request to start a VoIP call, or receiving an IP-VT start request.

The upstream QoS identifier and the downstream QoS identifier are selected on the AT side, depending on the application of the AT, and are contained in a QoS start request and sent to the AP. The AP knows the service and use (VoIP, IP-VT, emergency communication, and so on) of each QoS identifier with reference to the standard.

The standard specification (3GPP2 TSG-C Specification) stipulates services corresponding to QoS identifiers. The currently referenced versions include C.R1001-F_v1.0_061211. The relationship between the QoS identifier and the service should not be changed dynamically. A QoS identifier list and the like should be organized in accordance with the standard and should be shared between the AT and the AP. A table or the like can be downloaded from a server to the AT. When the VoIP button is pressed, the AT can reference the standard specification and can obtain a unique QoS identifier selected in accordance with a service type such as VoIP. The AT conducts negotiations with the AP by using the QoS identifier.

The QoS acceptance determination block 802 makes a QoS acceptance determination (402) (for the QoS acceptance determination, see FIG. 6, FIG. 12, and the corresponding descriptions). The QoS acceptance determination (402) includes the upstream noise determination (601) and the downstream band determination (602). If the two determinations indicate that it is serviceable, QoS can be started. If it is determined that it is serviceable, the QoS acceptance determination block 802 adds information to the table (1310). In the step of addition to the table (1310), a call index (1308) and a downstream QoS identifier (1309) corresponding to the AT 104 are added to the occupied QoS table 1208 managed by the downstream band determination block 1202 in the QoS acceptance determination block 802. A QoS start permission (1304) notification is given to the call control block 804. The call control block 804 receives the notification, performs processing from a QoS preparation request (403) to a QoS preparation completion (406), which are shown in FIG. 4, and then sends a QoS start notification (1308) to the AT 104. In the QoS acceptance determination (402), the AT that has made a current QoS start request is checked, and the result is returned to the AT.

The QoS acceptance determination block 802 makes a QoS acceptance determination on QoS for VoIP requiring the band R (609), on the basis of the occupied QoS table 1208 and the required band table 1211 updated by the addition to the table (1310), as described above. This QoS acceptance determination is specifically referred to as a new VoIP acceptance determination (1305). In the new VoIP acceptance determination (1305), the upstream noise determination block 1201 makes an upstream noise determination by using the upstream QoS identifier corresponding to VoIP, specified in the setting storage block 1221 and performing the same processing as the upstream noise determination (601) in the QoS acceptance determination (402). The downstream band determination block 1202 makes a downstream band determination by using the downstream QoS identifier corresponding to VoIP, specified in the setting storage block 1222 and performing the same processing as the downstream band determination (602) in the QoS acceptance determination (402).

The QoS acceptance determination (402) includes the upstream noise determination (601) and the downstream band determination (602). If the two determinations indicate that it is serviceable, QoS can be started.

If the new VoIP acceptance determination (1305) indicates that it is not serviceable, the result is reported to the BCMCS control block 803 by a VoIP congestion information notification (1307). If the determination indicates that it is serviceable, the VoIP congestion information notification (1307) is not sent, and the VoIP congestion information (1309) is not broadcasted. The BCMCS control block 803 broadcasts the VoIP congestion information (1309) as BCMCS data in the area of the AP 106.

The new VoIP acceptance determination (1305) is made on both the upstream and downstream QoS identifiers of VoIP. The AT that has made a current request has already been judged in the QoS acceptance determination (402), and the new VoIP acceptance determination determines whether an AT which would make a request in the future can be accepted. It determines whether any terminal that would make a next VoIP connection request could be accepted. If the new VoIP acceptance determination indicates that a subsequent AT cannot be accepted, the fact is broadcast (1309) to suppress a further QoS start request from the AT.

The BCMCS data can be sent in a channel counted as the reserved channels 203 (for the reserved channels, see FIG. 2 and the corresponding description). The AT 104 and the AT 1301 in the area of the AP 106 receive the VoIP congestion information (1309). A display screen 1310 of the AT 908 which has received the VoIP congestion information (1309), represented by the AT 1301, displays information notifying the user of the VoIP congestion (1311). The information, however, is not displayed on the screen of the AT while its VoIP call is in progress.

Figure 14:
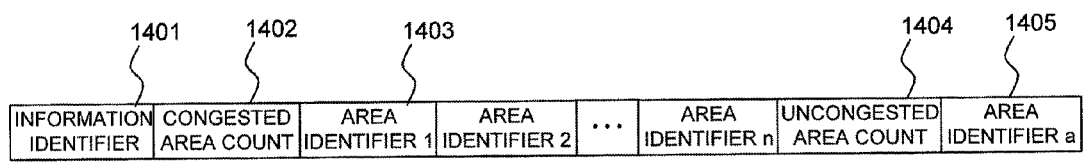
FIG. 14 illustrates VoIP congestion information (1309) in detail.

FIG. 14 illustrates the VoIP congestion information (1309) in detail.

The VoIP congestion information (1309) contains an information identifier 1401 for indicating that the data is VoIP congestion information, immediately followed by a congested area count 1402 indicating the number of congested areas included in the information and the area identifiers 1403 of the congested areas. The area identifier 1403 stored in the 1xEVDO system is a pilot PN (8 bits) stipulated in the C.S 0024. The area identifiers 1403 are followed by an uncongested area count 1404 indicating the number of uncongested areas and the area identifiers 1405 of the uncongested areas, which are used to report congestion clear-up when it occurs. The area identifiers 1405 may be of the same type as the area identifiers 1403. However, the area identifiers 1405 do not overlap the area identifiers 1403.

Clear-Up Notification

If QoS for VoIP cannot be started as a result a QoS acceptance determination, when the QoS rejection state is resolved, the fact is reported to the ATs by using the BCMCS. The notification method will be described below.

Figure 15:
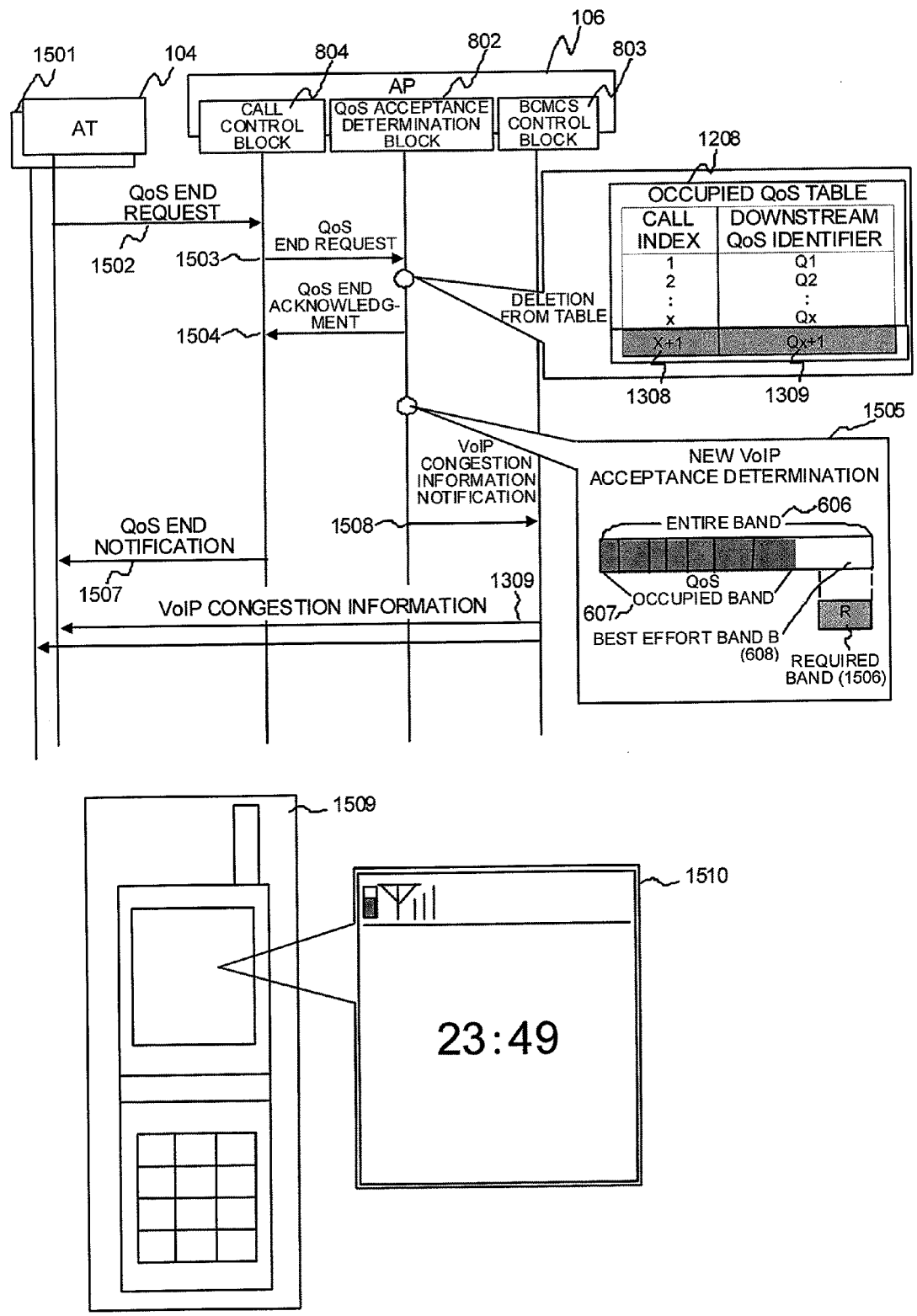
FIG. 15 shows a sequence of steps in which a single AP reports that QoS can be started under the control of the AP.

FIG. 15 shows a sequence of steps in which a single AP reports that QoS under the control of the AP can be started.

The AT 104 and an AT 1501 are in the area, and the AT 104 is in the call connection state. The QoS acceptance determination block 802 has detected that new VoIP cannot be accepted (1305) as described in "Congestion notification" of the second embodiment. The call control block 804 of the AP 106 receives a QoS end request (1502) from the AT 104 and issues a QoS end request (1503) to the QoS acceptance determination block 802. The QoS end request (1502) is issued as driven by an operation carried out on the AT, such as pressing the end button to end a VoIP call, pressing the end button to end IP-VT, ending a call by a VoIP call end operation carried out by the remote party, or ending IP-VT by an IP-VT end operation carried out by the remote party.

The QoS acceptance determination block 802 deletes the downstream QoS identifier (1309) of the corresponding call index (1308) from the occupied QoS table. A QoS end acknowledgment (1504) is also sent to the call control block 804. The call control block 804 then sends a QoS end notification (1507) to the AT 104. The QoS acceptance determination block 802 makes a new VoIP acceptance determination (1505) as described earlier. If the new VoIP acceptance determination (1505) indicates that it is serviceable, the result is contained in a VoIP congestion information notification (1508) and reported to the BCMCS control block 803. The BCMCS control block 803 broadcasts the VoIP congestion information (1309) as BCMCS data in the area of the AP 106. The AT 104 and the AT 1501 in the area of the AP 106 receive the VoIP congestion information (1309). On a display screen 1509 of the AT 908 which has received the VoIP congestion information (1309), represented by the AT 1501, the information notifying the user of congestion (1311) is erased.

4. Third Embodiment

If a call connection is impossible because of channel congestion and if the AT has not received an acknowledgment using the BCMCS or if the AT does not support the function, the call connection rejection is notified in the method as described below. An example of operation of the AT which has received the notification will also be described. The channel allocation determination is the same as that described with reference to FIG. 2 or FIG. 9.

Described below will be the notification to a single AT, of the rejection of a connection because of channel congestion.

Figure 16:
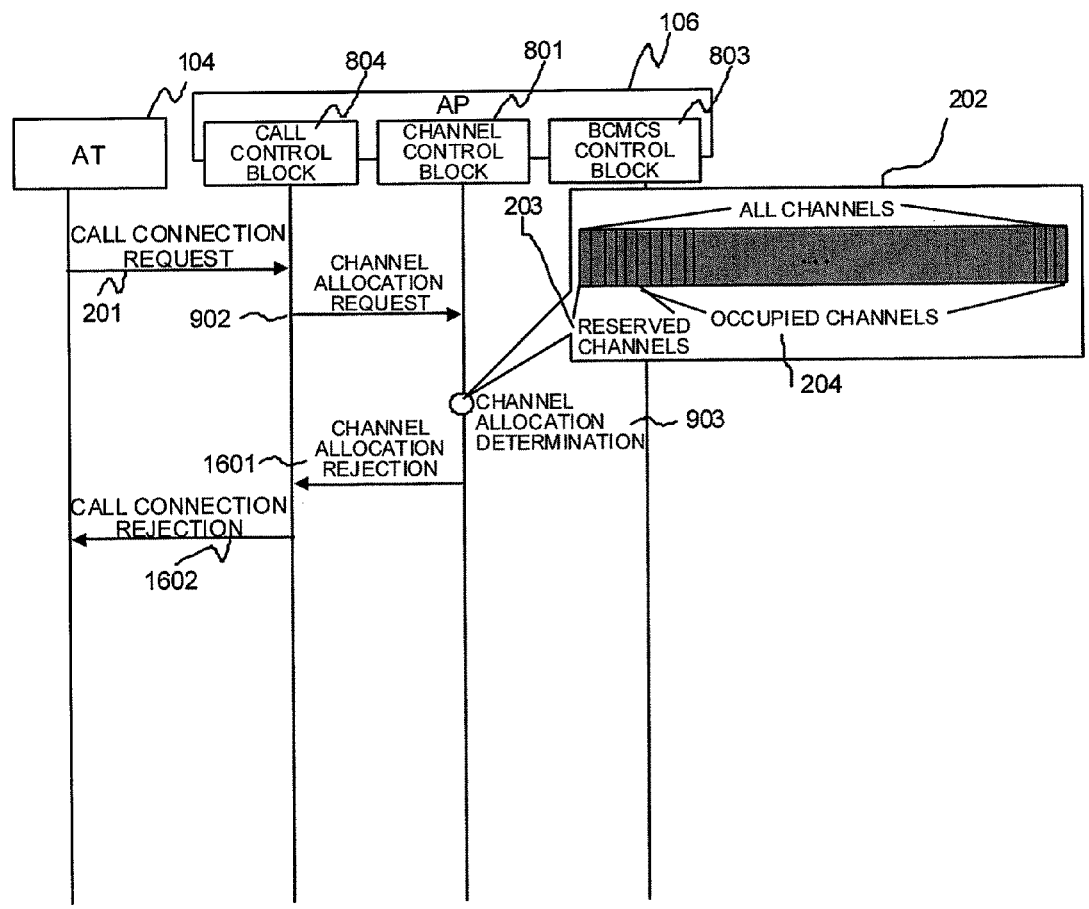
FIG. 16 shows a sequence of steps of implementing a function.
Figure 16:
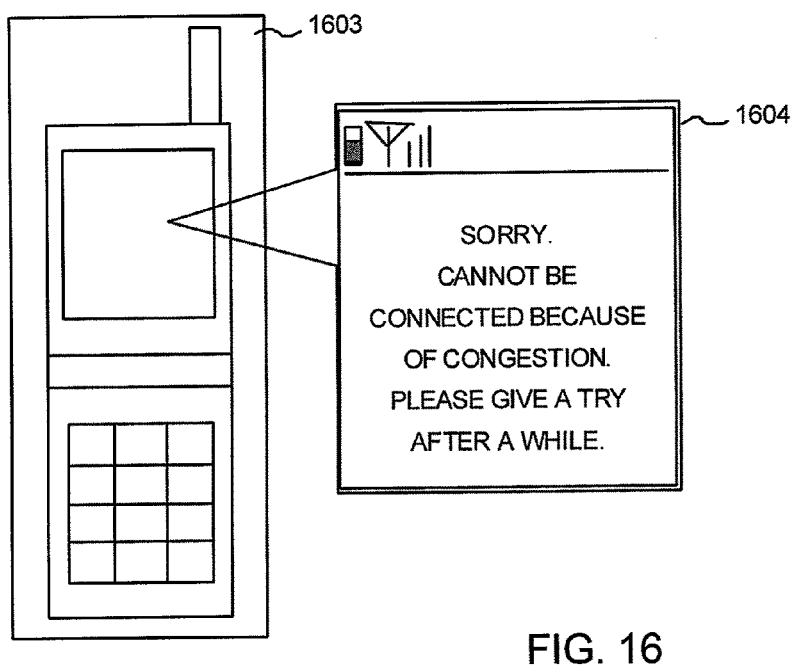

FIG. 16 shows a sequence of steps of implementing a function.

The AP 106 has the AT 104 which is not making a call connection in its area. The call control block 804 of the AP 106 receives a call connection request (201) from the AT 104 and issues a channel allocation request (902) to the channel control block 801.

The channel control block 801 makes a channel allocation determination (903), determines that channel allocation is impossible because there is not an unallocated channel 205, and sends a channel allocation rejection acknowledgment (1601) to the call control block 804. The call control block 804 receives the acknowledgment and sends a call connection rejection acknowledgment (1602) to the AT 104. When the AT 104 receives the acknowledgment, information notifying the user that the connection cannot be made because of channel congestion (1604) is displayed on a display screen 1603 of the AT 104.

5. Fourth Embodiment

If QoS for VoIP cannot be started as a result of a QoS acceptance determination and if the AT has not received a notification using the BCMCS or if the AT does not support the function, the AT is notified of the rejection of the start of QoS. The notification method and an example of operation of the AT which has received the notification will be described. Described below will be a case in which a single AT is notified that QoS cannot be started because of band congestion. The QoS acceptance determination is the same as that described with reference to FIG. 6 or FIG. 13.

Figure 17:
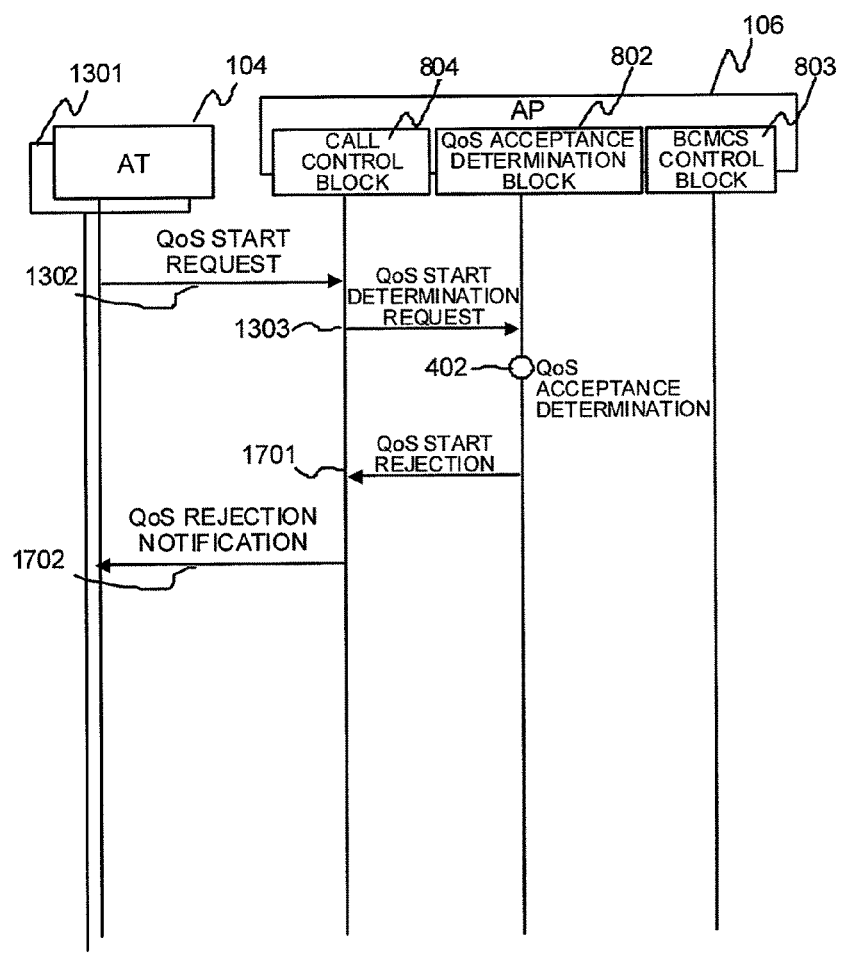
FIG. 17 shows a sequence of steps of implementing a function.
Figure 17:
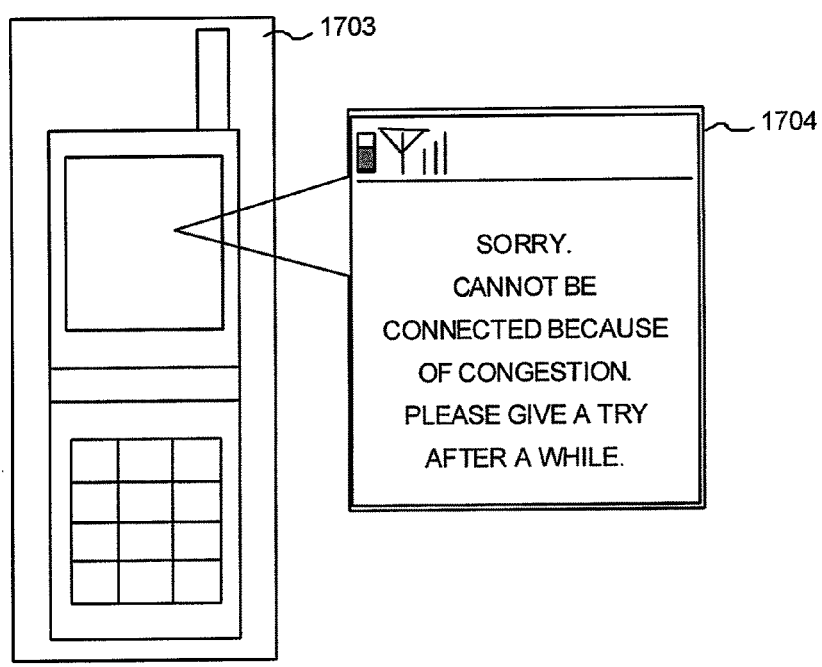

FIG. 17 shows a sequence of steps of implementing a function.

The AP 106 has the AT 104 in its area. The call control block 804 of the AP 106 receives a QoS start request (1302) from the AT 104 and issues a QoS start determination request (1303) to the QoS acceptance determination block 802.

The QoS acceptance determination block 802 makes a QoS acceptance determination (402). If the determination indicates that it is not serviceable, the QoS acceptance determination block 802 sends a QoS start rejection notification (1701) to the call control block 804. The call control block 804 receives the notification and sends a QoS rejection notification (1702) to the AT 104. When the AT 104 receives the acknowledgment, information notifying the user that the connection cannot be made because of VoIP congestion (1704) is displayed on a display screen 1703 of the AT 104.

6. Fifth Embodiment

Congestion Notification

Figure 18:
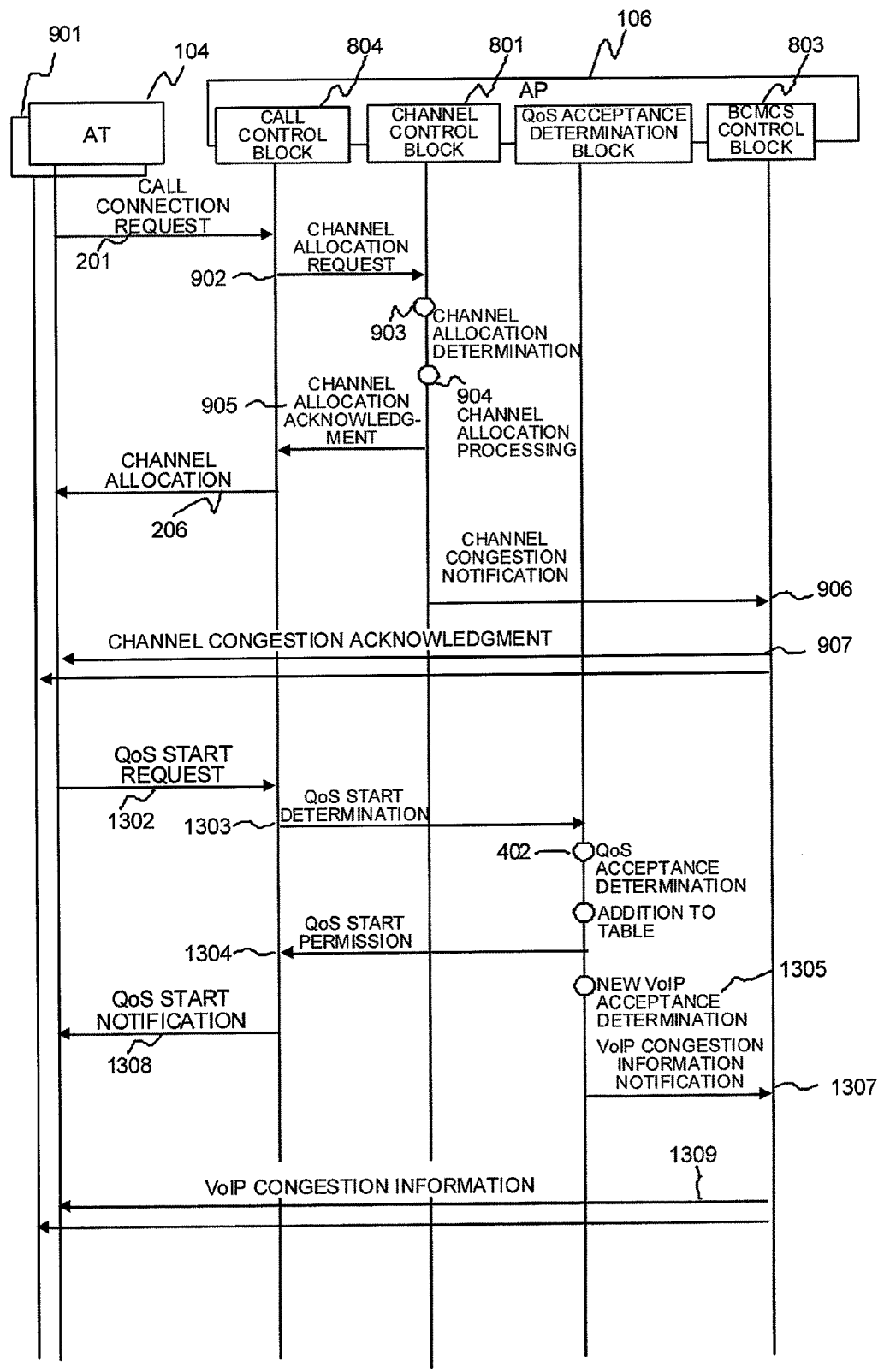
FIG. 18 shows a sequence (1) of steps of implementing a function by a channel allocation determination and a QoS acceptance determination.

FIG. 18 shows a sequence (1) of steps of implementing a function by a channel allocation determination and a QoS acceptance determination. This embodiment includes both the first embodiment and the second embodiment, described earlier.

The sequence of steps from keeping a channel at power-up to starting QoS by pressing the VoIP start button will be described. The AP 106 executes the following processing as in the first embodiment.

When the user presses the power button, the AT 104 issues a call connection request to the AP 106. The call control block 804 receives the call connection request and issues a channel allocation request to the channel control block 801. The channel control block 801 receives the request and makes a channel allocation determination. If the channel allocation determination indicates that channel allocation is possible, the channel allocation processing is performed, and a channel allocation acknowledgment is returned to the call control block 801. The call control block 801 receives the channel allocation acknowledgment and notifies the AT of the channel allocation. If the channel allocation causes channel congestion, a channel congestion notification is issued to the BCMCS control block 803, and the BCMCS control block 803 broadcasts the channel congestion information in the area controlled by the local AP.

The AP 106 then executes the following processing in the same way as described in the second embodiment.

After the channel allocation is completed, when the AT user presses the VoIP call start button, the AT 104 issues a request to start QoS for VoIP. The call control block 804 of the AP 106 receives the request and requests the QoS acceptance determination block 802 to determine whether QoS can be started. If the QoS acceptance determination indicates that QoS can be started, the QoS acceptance determination block 802 adds the corresponding information to the table and sends a QoS start permission notification to the call control block 804. The call control block 804 receives the notification and issues a QoS start acknowledgment to the AT 104. A QoS acceptance determination is carried out in advance to check whether the next QoS for VoIP can be accepted, and if it is obvious that it is not serviceable, a VoIP congestion information acknowledgment is issued to the BCMCS control block 803. The BCMCS control block 803 broadcasts VoIP congestion information in the area controlled by the local AP.

The AT 104 can start a VoIP call when it receives the QoS start acknowledgment, and the VoIP call continues until the user makes an operation to end the call (such as pressing the end button).

7. Sixth Embodiment

Figure 19:
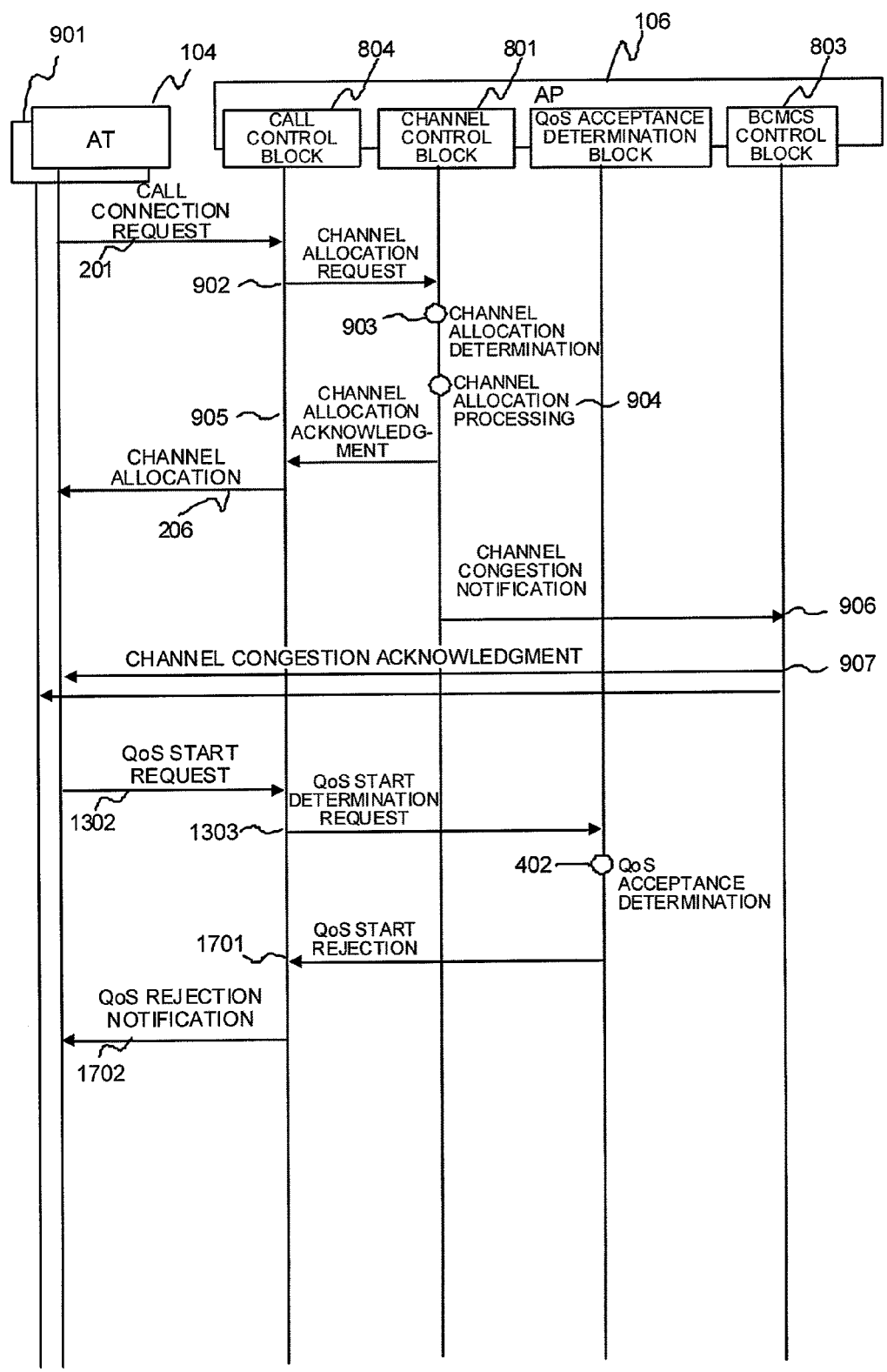
FIG. 19 shows a sequence (2) of steps of implementing a function by a channel allocation determination and a QoS acceptance determination.

FIG. 19 shows a sequence (2) of steps of implementing a function by a channel allocation determination and a QoS acceptance determination.

The sequence described here is an operation performed if QoS cannot be started successfully when the VoIP call start button is pressed after a channel is kept at power-up. The processing up to channel allocation is performed as described in the fifth embodiment.

When the AT user presses the VoIP call start button after the channel allocation is completed, the AT 104 issues a request to start QoS for VoIP. The call control block 804 of the AP 106 receives the request and requests the QoS acceptance determination block 802 to determine whether QoS can be started. If the QoS acceptance determination indicates that QoS cannot be started, the QoS acceptance determination block 802 sends a QoS start rejection acknowledgment to the call control block 804. When the acknowledgment is received, the call control block 804 issues a QoS rejection acknowledgment to the AT 104.

The AT 104 recognizes that the VoIP call cannot be started when it receives the QoS rejection acknowledgment. The display screen of the AT 104 shows information telling the user that the connection cannot be made because of VoIP congestion.

Generally, even if the VoIP call cannot be made, best-effort data communication is possible. Therefore, the AT holds the kept channel for a certain period of time and uses it for data communication (such as browsing the web) if necessary. A call disconnection request is issued on expiry of a certain period after the end of the data communication, and the channel is released.

What is claimed is:

1. A status notification method in a wireless communication apparatus for performing wireless communication with a wireless terminal, the status notification method comprising the steps of:

the wireless communication apparatus receiving a QoS start request containing an upstream QoS identifier and a downstream QoS identifier from the wireless terminal;

executing a first upstream noise determination by comparing a current noise level Ns of upstream traffic noise measured in the wireless communication apparatus with a permissible noise level ShN to start QoS, corresponding to the upstream QoS identifier and, if Ns<ShN, determining that upstream QoS can be accepted;

executing a first downstream band determination by comparing a band B obtained by subtracting a QoS occupied band from the entire downstream band BW, with a band R required to start QoS, corresponding to the downstream QoS identifier and, if B>R, determining that downstream QoS can be accepted;

executing a first QoS acceptance determination to determine that it is serviceable if both the first upstream noise determination and the first downstream band determination indicate that it is serviceable;

adding the downstream QoS identifier corresponding to the wireless terminal to an occupied QoS table if the first QoS acceptance determination indicates that it is serviceable;

sending a QoS start acknowledgment to the wireless terminal;

executing a second upstream noise determination by comparing the current noise level Ns of the upstream traffic noise measured by an upstream traffic reception block of the wireless communication apparatus with the permissible noise level ShN to start QoS, predetermined for VoIP or another specific service and corresponding to an upstream QoS identifier setting, and if N<ShN, determining that upstream QoS can be accepted;

executing a second downstream band determination by comparing the band B obtained by subtracting the QoS occupied band obtained from the occupied QoS table updated when the downstream QoS identifier is added to the table, from the entire downstream band BW, with the band R required to start QoS, predetermined for VoIP or another specific service and corresponding to a downstream QoS identifier setting, and if B>R, determining that downstream QoS can be accepted;

executing a second QoS acceptance determination to determine that it is serviceable if both the second upstream noise determination and the second downstream band determination indicate that it is serviceable;

broadcasting first channel congestion information in an area of the wireless communication apparatus if the second QoS acceptance determination indicates that it is not serviceable; and the wireless terminal in a communication area of the wireless communication apparatus displaying information notifying the user of the occurrence of congestion on a display screen when it receives the first channel congestion information.

2. A status notification method in a wireless communication apparatus for performing wireless communication with a wireless terminal, the status notification method comprising the steps of:

the wireless communication apparatus receiving a call connection request from the wireless terminal;

the wireless communication apparatus obtaining unallocated channels by excluding reserved channels and occupied channels from all channels, and determining that channel allocation is possible if there is an unallocated channel or determining that channel allocation is impossible because of congestion if there is no unallocated channel;

if the determination indicates that channel allocation is possible, the wireless communication apparatus performing channel allocation processing for the wireless terminal;

if it is determined that the channel allocation processing has increased the occupied channels, remaining no unallocated channel, the wireless communication apparatus broadcasting first channel congestion information to announce the occurrence of congestion in an area of the wireless communication apparatus; and the wireless terminal in a communication area of the wireless communication apparatus displaying information notifying the user of the congestion on a display screen when it receives the first channel congestion information; and, the wireless communication apparatus receiving a QoS start request containing an upstream QoS identifier and a downstream QoS identifier from the wireless terminal;

executing a first upstream noise determination by comparing a current noise level Ns of upstream traffic noise measured by an upstream traffic reception block of the wireless communication apparatus with a permissible noise level ShN to start QoS, corresponding to the upstream QoS identifier and, if Ns<ShN, determining that upstream QoS can be accepted;

executing a first downstream band determination by comparing a band B obtained by subtracting a QoS occupied band from the entire downstream band BW, with a band R required to start QoS, corresponding to the downstream QoS identifier and, if B>R, determining that downstream QoS can be accepted;

executing a first QoS acceptance determination to determine that it is serviceable if both the first upstream noise determination and the first downstream band determination indicate that it is serviceable;

adding the downstream QoS identifier corresponding to the wireless terminal to an occupied QoS table if the first QoS acceptance determination indicates that it is serviceable;

sending a QoS start acknowledgment to the wireless terminal;

executing a second upstream noise determination by comparing the current noise level Ns of the upstream traffic noise measured by the upstream traffic reception block of the wireless communication apparatus with the permissible noise level ShN to start QoS, predetermined for VoIP or another specific service and corresponding to an upstream QoS identifier setting, and if Ns<ShN, determining that upstream QoS can be accepted;

executing a second downstream band determination by comparing the band B obtained by subtracting the QoS occupied band obtained from the occupied QoS table updated when the downstream QoS identifier is added to the table, from the entire downstream band BW, with the band R required to start QoS, predetermined for VoIP or another specific service and corresponding to a downstream QoS identifier setting, and if B>R, determining that downstream QoS can be accepted;

executing a second QoS acceptance determination to determine that it is serviceable if both the second upstream noise determination and the second downstream band determination indicate that it is serviceable;

broadcasting second channel congestion information in an area of the wireless communication apparatus if the second QoS acceptance determination indicates that it is not serviceable; and the wireless terminal in a communication area of the wireless communication apparatus displaying information notifying the user of the occurrence of congestion on a display screen when it receives the second channel congestion information.

3. A status notification method according to claim 1, wherein the channel congestion information is distributed as broadcast or multicast data, by using reserved channels including a broadcast or multicast distribution channel through which all wireless terminals in the communication area of the wireless communication apparatus can receive the information.

4. A status notification method according to claim 2, wherein the channel congestion information is distributed as broadcast or multicast data, by using reserved channels including a broadcast or multicast distribution channel through which all wireless terminals in the communication area of the wireless communication apparatus can receive the information.

5. A status notification method according to claim 2, wherein:
the wireless communication apparatus performs channel release processing when the wireless terminal in a call connection status makes a call disconnection request after the first channel congestion information is detected;
if the channel release processing decreases the occupied channels and provides an unallocated channel, the wireless communication apparatus broadcasts second channel congestion information for clearing up congestion within the area of the wireless communication apparatus by using the reserved channels, thereby erasing the information indicating the occurrence of congestion from the display screen of the wireless terminal which has received the second channel congestion information in the area of the wireless communication apparatus.

6. A status notification method according to claim 2, wherein the call connection request is issued at power-up, at a dial-up connection, or at the beginning of data communication on expiry of a predetermined period after the end of dial-up connection establishment.

7. A status notification method according to claim 2, wherein the call disconnection request is issued when the power-down button is pressed, at a dial-up disconnection, or on expiry of a predetermined period after the end of the dial-up connection.

8. A status notification method according to claim 1, wherein
when the wireless communication apparatus receives a QoS end request from the wireless terminal in a call connection status after the first channel congestion information is detected,
the wireless communication apparatus deletes the corresponding downstream QoS identifier from the occupied QoS table; and
the wireless communication apparatus executes the second QoS acceptance determination and, if it is determined that it is serviceable, broadcasts second channel congestion information for clearing up the congestion in the area of the wireless communication apparatus by using the reserved channels, thereby erasing the information indicating the occurrence of congestion from the display screen of the wireless terminal which has received the second channel congestion information in the area of the wireless communication apparatus.

9. A status notification method according to claim 2, wherein
when the wireless communication apparatus receives a QoS end request from the wireless terminal in a call connection status after the first channel congestion information is detected,
the wireless communication apparatus deletes the corresponding downstream QoS identifier from the occupied QoS table; and
the wireless communication apparatus executes the second QoS acceptance determination and, if it is determined that it is serviceable, broadcasts second channel congestion information for clearing up the congestion in the area of the wireless communication apparatus by using the reserved channels, thereby erasing the information indicating the occurrence of congestion from the display screen of the wireless terminal which has received the second channel congestion information in the area of the wireless communication apparatus.

10. A status notification method according to claim 1, wherein the QoS start request is issued as driven by an operation carried out on the wireless terminal, and the operation includes pressing a start button to start a VoIP call, pressing the start button to start IP-VT, receiving a request to start a VoIP call, or receiving an IP-VT start request.

11. A status notification method according to claim 2, wherein the QoS start request is issued as driven by an operation carried out on the wireless terminal, and the operation includes pressing a start button to start a VoIP call, pressing the start button to start IP-VT, receiving a request to start a VoIP call, or receiving an IP-VT start request.

12. A status notification method according to claim 1, wherein a QoS end request is issued as driven by an operation carried out on the wireless terminal, and the operation includes pressing an end button to end a VoIP call, pressing the end button to end IP-VT, ending a call by a VoIP call end operation carried out by the remote party, or ending IP-VT by an IP-VT end operation carried out by the remote party.

13. A status notification method according to claim 2, wherein a QoS end request is issued as driven by an operation carried out on the wireless terminal, and the operation includes pressing an end button to end a VoIP call, pressing the end button to end IP-VT, ending a call by a VoIP call end operation carried out by the remote party, or ending IP-VT by an IP-VT end operation carried out by the remote party.

14. A status notification method according to claim 1, wherein the wireless communication apparatus comprises:
an upstream noise determination block for making an upstream noise determination, the upstream noise determination block comprising:
a measurement block for monitoring current upstream noise N;
a permissible noise table including a list of upstream QoS identifiers (1 to k) and a corresponding list of permissible noise levels (1 to Shk); and
a first setting storage block for storing upstream QoS identifier settings predetermined for VoIP or other services; and
a downstream band determination block for making a downstream band determination, the downstream band determination block comprising:
an occupied QoS table including a list of connected call indices (1 to x) and a corresponding list of downstream QoS identifiers (Q1 to Qx);
a required band table including a list of downstream QoS identifiers (1 to L) and a corresponding list of required bands (R1 to RL); and
a second setting storage block for storing the settings of the entire band and downstream QoS identifier settings predetermined for VoIP or other services;
wherein, in the upstream noise determination, the upstream noise determination block references the permissible noise table to find the permissible noise level ShN corresponding to the upstream QoS identifier N of the target, compares the level with the current upstream noise Ns, and determines that upstream QoS can be accepted if Ns<ShN;

in the downstream band determination, the downstream band determination block obtains the QoS occupied band by obtaining the required bands corresponding to all the downstream QoS identifiers included in the occupied QoS table by using the required band table and accumulating them, obtains a best effort band B from the QoS occupied band and the entire band, obtains a required band RM from the downstream QoS identifier M of the target, and determines that downstream QoS can be accepted for the QoS identifier M if B>RM.

15. A status notification method according to claim 2, wherein the wireless communication apparatus comprises:
   an upstream noise determination block for making an upstream noise determination, the upstream noise determination block comprising:
      a measurement block for monitoring current upstream noise N;
      a permissible noise table including a list of upstream QoS identifiers (1 to k) and a corresponding list of permissible noise levels (1 to Shk); and
      a first setting storage block for storing upstream QoS identifier settings predetermined for VoIP or other services; and
   a downstream band determination block for making a downstream band determination, the downstream band determination block comprising:
      an occupied QoS table including a list of connected call indices (1 to x) and a corresponding list of downstream QoS identifiers (Q1 to Qx);
      a required band table including a list of downstream QoS identifiers (1 to L) and a corresponding list of required bands (R1 to RL); and
      a second setting storage block for storing the settings of the entire band and downstream QoS identifier settings predetermined for VoIP or other services;

wherein, in the upstream noise determination, the upstream noise determination block references the permissible noise table to find the permissible noise level ShN corresponding to the upstream QoS identifier N of the target, compares the level with the current upstream noise Ns, and determines that upstream QoS can be accepted if Ns<ShN;

in the downstream band determination, the downstream band determination block obtains the QoS occupied band by obtaining the required bands corresponding to all the downstream QoS identifiers included in the occupied QoS table by using the required band table and accumulating them, obtains a best effort band B from the QoS occupied band and the entire band, obtains a required band RM from the downstream QoS identifier M of the target, and determines that downstream QoS can be accepted for the QoS identifier M if B>RM.

* * * * *